(12) United States Patent
Ikeno et al.

(10) Patent No.: US 6,977,698 B2
(45) Date of Patent: Dec. 20, 2005

(54) LIQUID CRYSTAL DISPLAY

(75) Inventors: Hidenori Ikeno, Tokyo (JP);
Masayoshi Suzuki, Tokyo (JP);
Youichi Murayama, Tokyo (JP);
Michiaki Sakamoto, Tokyo (JP);
Fumihiko Matsuno, Tokyo (JP);
Hironori Kikkawa, Tokyo (JP); Yuichi Yamaguchi, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 10/862,953

(22) Filed: Jun. 8, 2004

(65) Prior Publication Data

US 2004/0218120 A1 Nov. 4, 2004

Related U.S. Application Data

(62) Division of application No. 10/214,250, filed on Aug. 7, 2002.

(30) Foreign Application Priority Data

Aug. 22, 2001 (JP) .............................. 2001-251087

(51) Int. Cl.[7] .......................................... G02F 1/1335
(52) U.S. Cl. ......................... 349/113; 349/106; 257/72
(58) Field of Search ................................. 349/113, 106; 257/72

(56) References Cited

U.S. PATENT DOCUMENTS

| | | | |
|---|---|---|---|
| 5,747,830 A * | 5/1998 | Okita | 257/72 |
| 6,618,107 B1 * | 9/2003 | Tanaka et al. | 349/106 |
| 6,784,957 B2 * | 8/2004 | Kanou et al. | 349/113 |

FOREIGN PATENT DOCUMENTS

| | | |
|---|---|---|
| CN | 1187630 A | 7/1998 |
| JP | 2000-321564 | 11/2000 |
| JP | 2001-75091 | 3/2001 |
| JP | 2001-075091 | 3/2001 |

* cited by examiner

Primary Examiner—Huyen Ngo
(74) Attorney, Agent, or Firm—Muirhead and Saturnelli, LLC

(57) ABSTRACT

A reflection electrode has an undulated shape and whose normal direction is distributed unevenly to a specific azimuth angle and whose reflection light intensity depends on said azimuth angle. Openings are formed in that area of the reflection electrode which has a tilt angle of 0 degree to 2 degrees and/or a tilt angle of 10 degrees or higher. The retardation of a liquid crystal layer is changed by making the liquid crystal molecular alignment mode different between the openings and the reflection electrode, so that the intensity of output light is increased in reflection mode as well as in transmission mode. The balance of colors displayed in transmission mode is determined by determining the area of the openings in pixels of each color, and the color temperature is set higher in transmission mode than in reflection mode. This provides a semi-transmission type liquid crystal display which has an excellent visibility in reflection mode as well as in transmission mode.

19 Claims, 25 Drawing Sheets

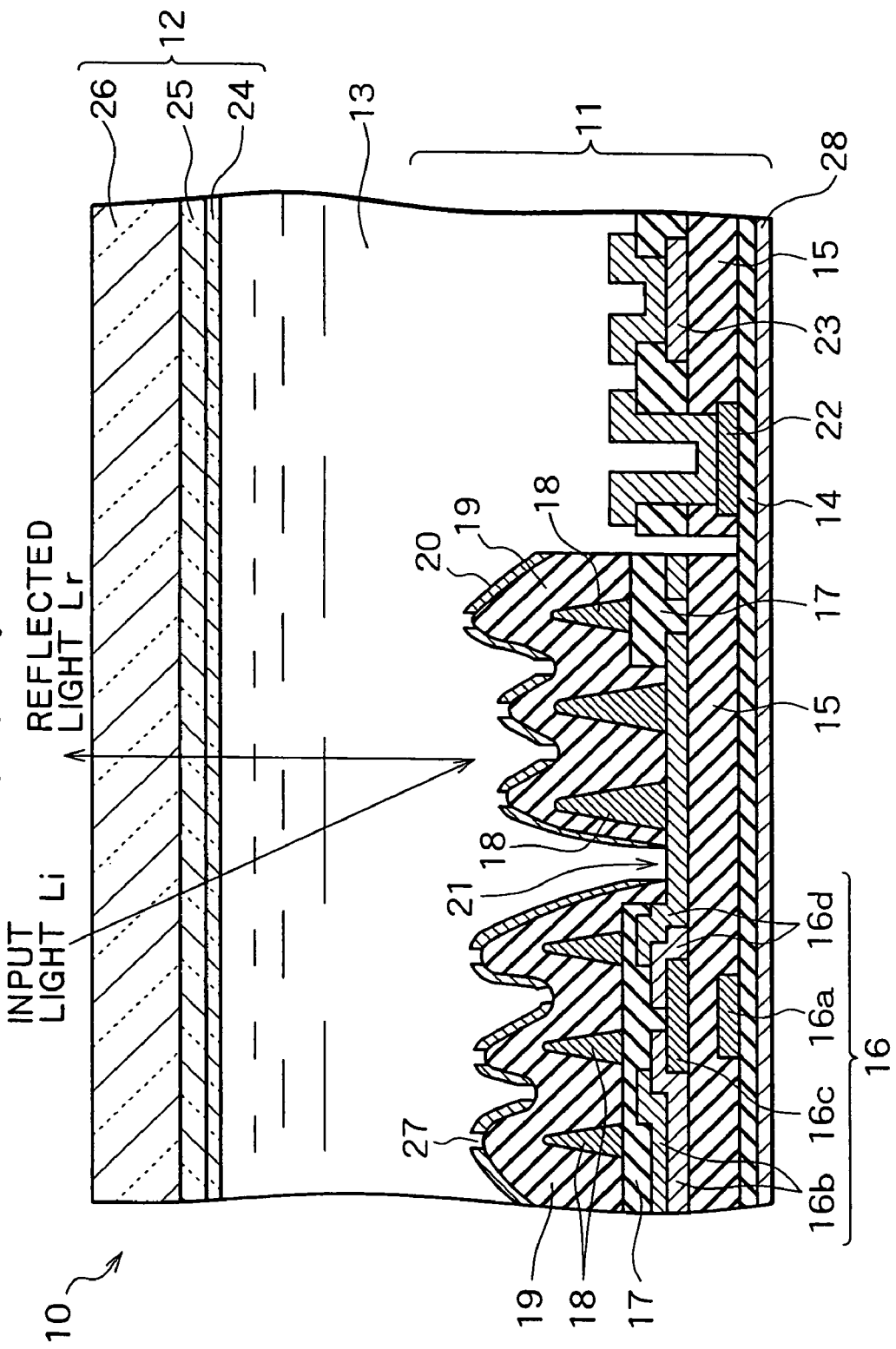

F I G. 12A
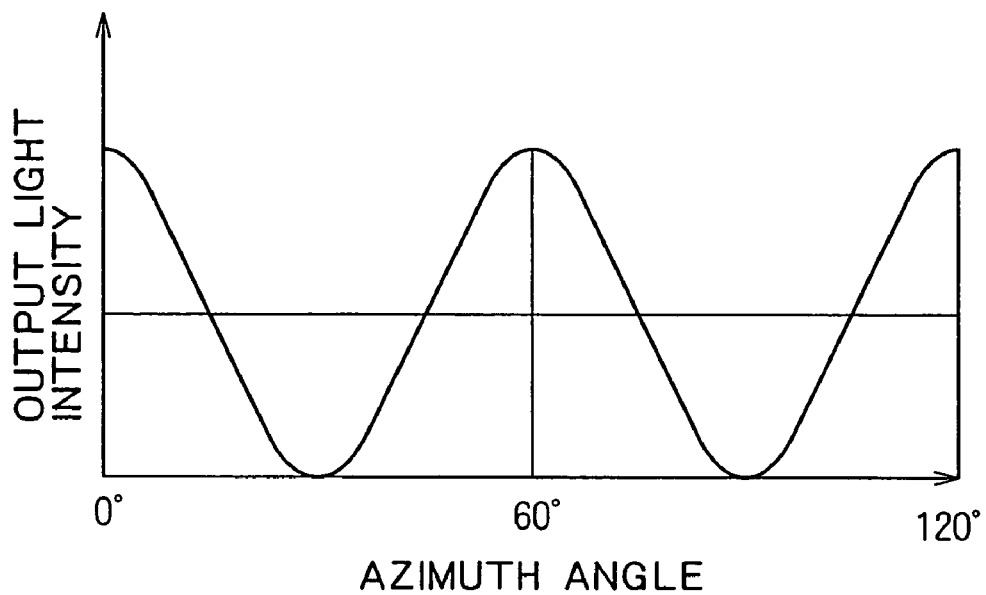
F I G. 12B
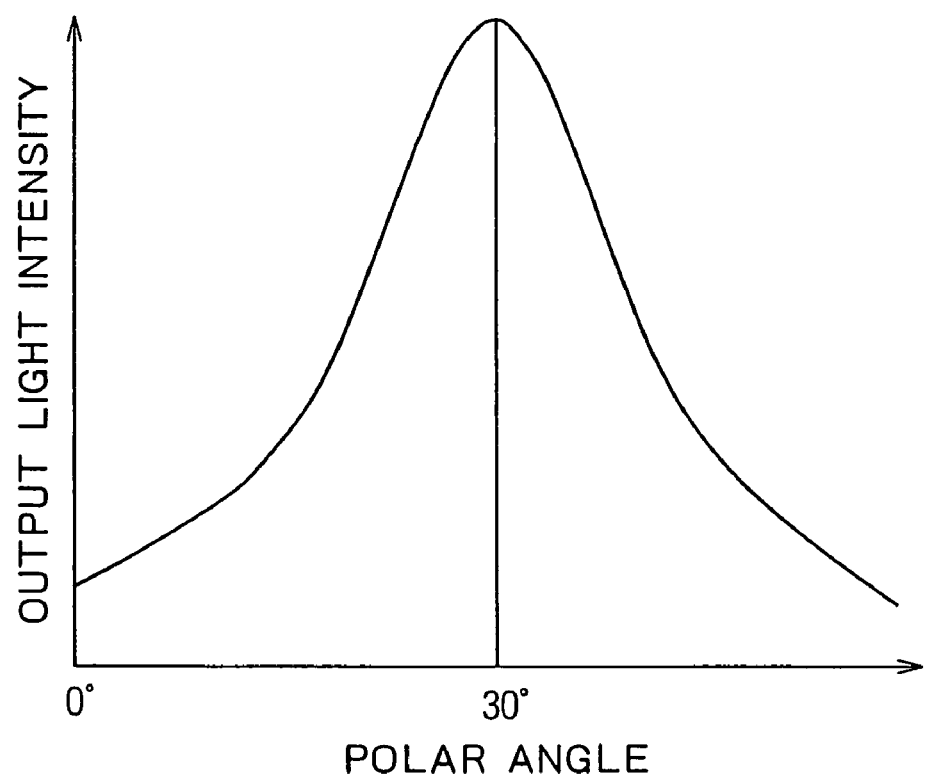

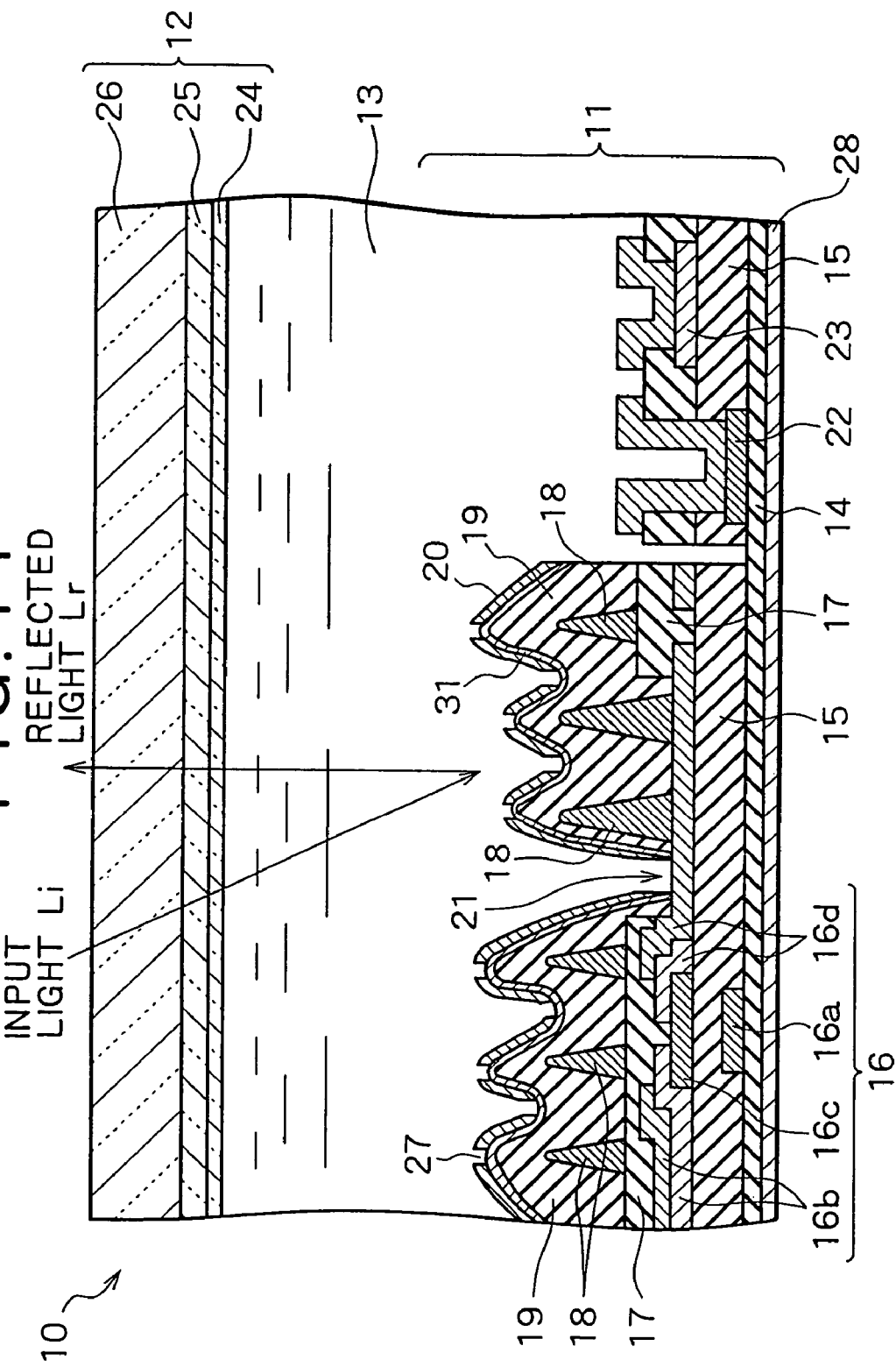

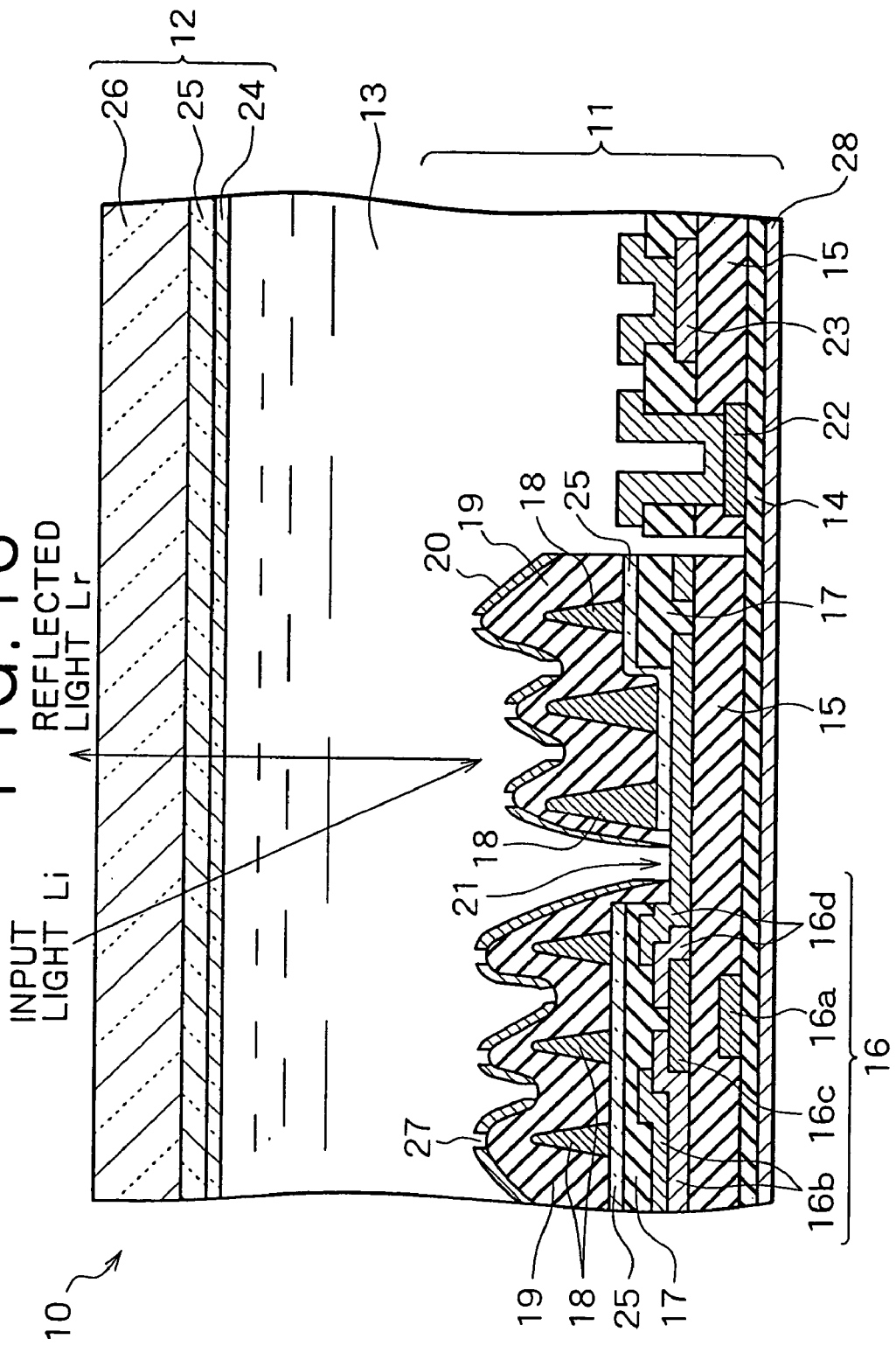

HOMOGENEOUS

HOMEOTROPIC

TN

HAN

OCB

UV IRRADIATED

F I G. 24
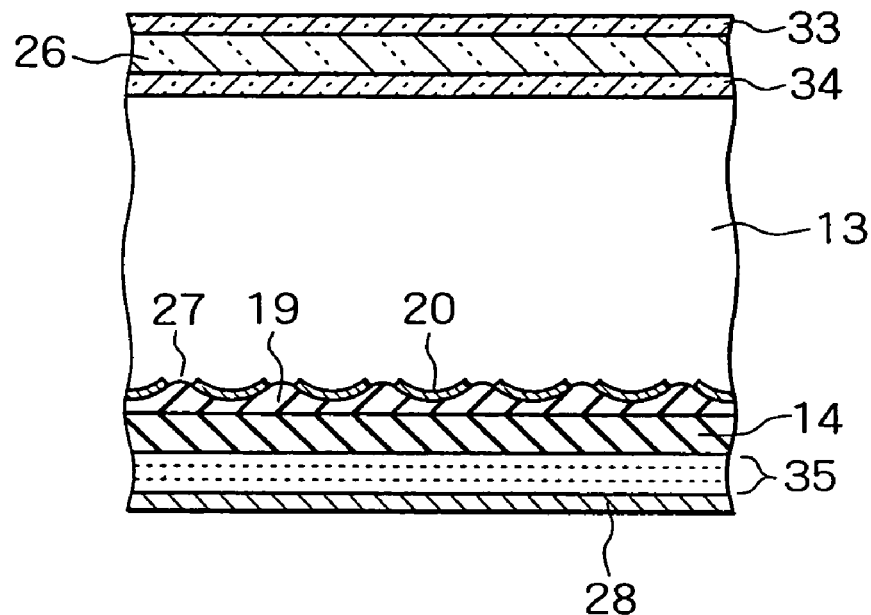
F I G. 25
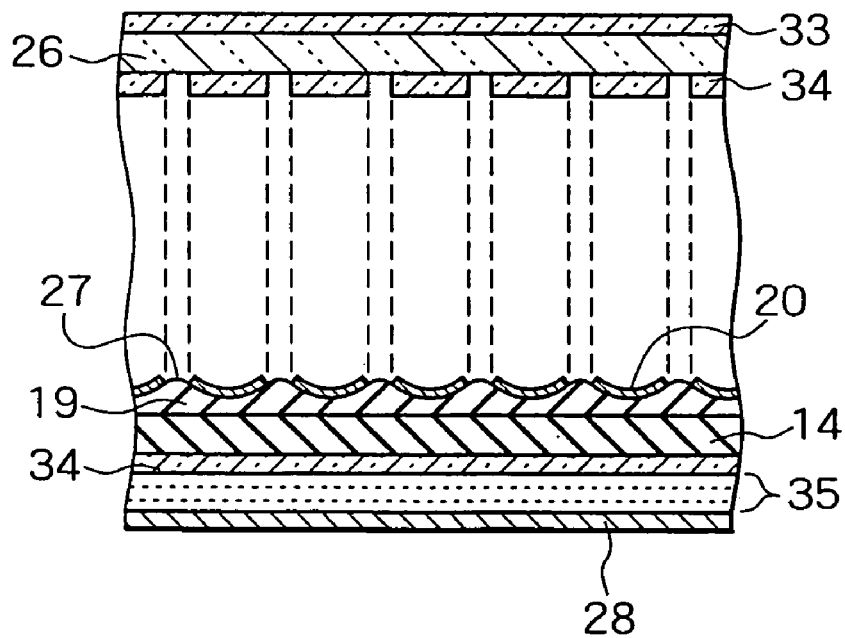

LIQUID CRYSTAL DISPLAY

CROSS REFERENCE TO RELATED APPLICATIONS

This application is a divisional of U.S. application Ser. No. 10/214,250 filed Aug. 7, 2002 (pending).

BACKGROUND OF THE INVENTION

1. Field of the Invention

The present invention relates to a liquid crystal display, and, more particularly, to a semi-transmission type liquid crystal display which reflects incident light coming from outside to provide a display light source and transmits light from a light source at the back.

2. Description of the Related Art

There is a reflection type liquid crystal display (LCD) known which has a reflector inside and reflects incident external light by the reflector to provide a display light source, thereby eliminating the need for a backlight as a light source and a transmission type liquid crystal display equipped with a backlight as a light source.

As the reflection type liquid crystal display can be designed with lower power consumption, thinner and lighter than the transmission type liquid crystal display, it is mainly used for a portable terminal. This is because as light input from outside is reflected at the reflector in the display, the light can be used as a display light source, thus eliminating the need for a backlight. The transmission type liquid crystal display has such a characteristic as having a better visibility than the reflection type liquid crystal display in case where ambient light is dark.

As a reflector which improves the luminance of a reflection type liquid crystal display, there is one which, for example, has isolated projections formed on the surface of the reflector leaving an organic insulating film in a photolithography process, and an interlayer film is provided on the projections, thereby yielding a smooth undulated shape with mountain portions comprised of the projections and the other or valley portions, so that an undulation pattern is formed on the surface of the reflector (see Japanese Patent No. 2825713).

FIG. 29 is a plan view showing an example of the undulation pattern formed on the conventional reflector. shown in FIG. 29, the undulation pattern is formed by arranging a plurality of projections 2 with a circular planar shape as a projection pattern or a base pattern on the surface of a reflector 1 in an isolated state. The undulation pattern causes irregular reflection of incident light, thus improving the luminance of the liquid crystal display.

The basic structure of the existing liquid crystal displays comprises a liquid crystal of an TN (Twisted Nematic) type, a single sheet polarizer type, an STN (Super Twisted Nematic) type, a GH (Guest-Host) type, a PDLC (Polymer Dispersed Liquid Crystal) type, a cholesteric type or the like, a switching element which drives the liquid crystal and a reflector or backlight provided inside or outside a liquid crystal cell. Those ordinary liquid crystal displays employ an active matrix drive system which can achieve high definition and high image quality using thin film transistors (TFTS) or metal/insulating film/metal structure diodes (MIMs) as switching elements, and are equipped with a reflector or backlight.

As a liquid crystal display which has advantages of both the conventional reflection type liquid crystal display and transmission type liquid crystal display, a semi-transmission type liquid crystal display is disclosed (see Japanese Patent No. 2955277) which, as shown in FIG. 30, has gate interconnections 4 and source interconnections 5 so provided as to run around pixel electrodes 3 of an active matrix substrate and intersect each other perpendicularly, has thin film transistors 6 provided on the pixel electrodes 3, has the gate interconnections 4 and source interconnections 5 connected to the gate electrodes and source electrodes of the thin film transistors 6 and has reflection areas 7 of a metal film and transmission areas 8 of ITO formed in the pixel electrodes 3.

As the reflection areas and transmission areas are provided in the pixel electrodes, the backlight can be turned off when the ambient light is bright so that the liquid crystal display can be used as a reflection type liquid crystal display, and thus demonstrates lower power consumption that is the characteristic of the reflection type liquid crystal display. When the ambient light is dark, the backlight is turned on so that the liquid crystal display is used as a transmission type liquid crystal display, and thus demonstrates an improved visibility in case where ambient light is dark, which is the characteristic of the transmission type liquid crystal display. Hereunder, a liquid crystal display which can be used as a reflection type liquid crystal display and as a transmission type liquid crystal display will be called as a semi-transmission type liquid crystal display.

In the liquid crystal display described in Japanese Patent No. 2955277, however, as shown in FIG. 31, undulations formed on an active matrix substrate are partly removed for planarization and transmission areas on the pixel electrodes are formed on the flat portion of the active matrix substrate. The undulations formed on the active matrix substrate are provided to efficiently reflect ambient light toward a user. In case where the areas of the undulations are reduced to form the transmission areas so that the liquid crystal display is used as a reflection type liquid crystal display with the backlight turned off, there arises a problem that the luminance drops.

Japanese Patent Laid-Open No. 2001-75091 describes a reflector which has isolated projections formed on the surface of the reflector by combining the above-described two prior arts, thereby forming an undulation pattern on the surface of the reflector, has openings formed in the top portions and bottom portions of the undulation pattern and uses openings as transmission areas. Because the projections have isolated circular shapes, however, the reflector simultaneously reflects incident lights from all the directions and has no directivity, the display luminance is undesirably reduced.

Because separation of the transmission areas from the reflection areas in the liquid crystal display described in Japanese Patent No. 2955277 is simple, it is easy to form color filters with different thicknesses on the opposite substrate for different areas. As the reflector described in Japanese Patent Laid-Open No. 2001-75091 has transmission areas and reflection areas mixed in pixels, however, it is difficult to form color filters with different thicknesses on the opposite substrate for different areas. This makes it impossible to adjust the thicknesses of the color filters area by area. Accordingly, light passes the color filter formed on the opposite substrate twice in reflection mode but passes it once in transmission mode. This changes the hue in transmission mode and reflection mode, so that the reduction in luminance and the change in hue lower the visibility.

SUMMARY OF THE INVENTION

Accordingly, it is an object of the invention to provide a semi-transmission type liquid crystal display which has an excellent visibility in reflection mode as well as in transmission mode.

A liquid crystal display according to the present invention comprises:

a device substrate on which interconnections, thin film transistors and storage capacitors are formed;

an opposite substrate so arranged as to face the device substrate;

a liquid crystal layer sandwiched between the device substrate and the opposite substrate;

a reflection electrode which is provided on the device substrate, which has an undulated shape and whose normal direction on a surface of the reflection electrode is distributed off-balanced to a specific azimuth angle and whose reflection light intensity depends on the azimuth angle; and openings provided in a non-effective area of the reflection electrode.

As the openings are provided in the reflection electrode, light is irradiated by a backlight or the like from the opposite side of the device substrate to the liquid crystal layer in transmission mode, allowing the light to pass the liquid crystal layer for liquid crystal display, so that display can be recognized even under a dark environment. As the normal direction of the reflection electrode is distributed unevenly to a specific azimuth angle, the undulated shape on the surface of the reflector is formed with anisotropy and the reflection light intensity depends on the azimuth angle, it is possible to increase the reflection light intensity in the normal direction of the reflector which has a polar angle of 0 degree at a specific bearing angle. This increases the amount of light reflected to a viewer, thereby ensuring an improvement of the visibility of the display that uses the reflector.

A liquid crystal display according to another aspect of the present invention comprises:

a device substrate on which interconnections, thin film transistors and storage capacitors are formed;

an opposite substrate so arranged as to face the device substrate;

a liquid crystal layer sandwiched between the device substrate and the opposite substrate;

a first color filter formed on the opposite substrate;

a second color filter formed on the thin film transistors;

a reflection electrode formed on the second color filter and having an undulated shape; and openings provided in a non-effective area of the reflection electrode.

As color filters are formed on the opposite substrate and the device substrate, light passes the color filter on the opposite substrate side twice in reflection mode and passes the color filters on the device substrate and the opposite substrate once each in transmission mode. This can make it possible to reduce a change in color in both modes. It is also possible to respectively set the hues in transmission mode and reflection mode.

The liquid crystal display can be constructed in such a way that a normal direction on a surface of the reflection electrode is distributed unevenly to a specific azimuth angle and a polar angle distribution of a reflection light intensity at the azimuth angle has two or more peak values.

Accordingly, the undulated shape on the surface of the reflector is formed with anisotropy, the reflection light intensity depends on the azimuth angle and two or more peak values appear in the polar angle distribution of the reflection light intensity at the azimuth angle. This makes it possible to increase the reflection light intensity in the normal direction of the reflector which has a polar angle of 0 degree at a specific bearing angle.

The undulated shape can be designed in such a way as to have recesses with a shape of a closed figure formed by a plurality of line-like projection patterns.

By forming the undulated shape by projection patterns and insulating layer and changing the line width, line length and thickness of the projection patterns and the thickness of the insulating layer, it is possible to design the undulated shape in such a way as to maximize the anisotropy of the reflector and the reflection light intensity in the normal direction.

For example, the liquid crystal display is characterized in that the openings are provided in the non-effective area of the reflection electrode as a transmission area, an effective area of the reflection electrode is a reflection area, and a potential difference between a drive voltage applied to that surface of the device substrate which faces the liquid crystal layer and a drive voltage applied to that surface of the opposite substrate which faces the liquid crystal layer is smaller in the transmission area than in the reflection area.

As the drive voltage applied to the liquid crystal layer in the reflection electrode is lower than the drive voltage applied to the liquid crystal layer in the transmission area, a change in the birefringence of the liquid crystal layer in the reflection area becomes smaller than a change in the birefringence of the liquid crystal layer in the transmission area. This makes it possible to set the optimal change in birefringence in each of the reflection mode and transmission mode, so that the output light intensity can be optimized in both modes.

The liquid crystal display is characterized in that the non-effective area has, for example, a tilt angle of 0 degree to 2 degrees and/or a tilt angle of 10 degrees or higher.

As the non-effective area where the openings are formed has a tilt angle of 0 degree to 2 degrees and/or a tilt angle of 10 degrees or higher, the non-effective area cannot efficiently reflect light input from the opposite substrate toward a viewer. Therefore, the luminance does not significantly drop even in reflection mode in which the light input from the opposite substrate is reflected at the reflection electrode for liquid crystal display.

For example, the liquid crystal display is characterized in that the openings are provided only in that area of the reflection electrode which overlaps that area of the device substrate which passes light.

The number of openings that do not pass light is reduced by forming the openings only in that area of the device substrate which passes light, thereby improving the light reflection efficiency.

The liquid crystal display can be constructed in such a way that the openings are not provided only in that area of the reflection electrode which overlaps the interconnections, the thin film transistors and the storage capacitors.

The interconnections, the thin film transistors and the storage capacitors are formed of opaque materials. Even if openings are formed in those areas of the reflection electrode which overlaps the interconnections, the thin film transistors and the storage capacitors, therefore, it is not possible to pass light from the backlight. If openings are formed in the mentioned areas, the interconnections, the lights reflected by the thin film transistors and the storage capacitors change the displayed colors of the liquid crystal. Therefore, forming no openings in those areas can prevent the liquid crystal display colors from changing.

The number of the openings in pixels can be set for each display color.

As the number of the openings in pixels can be made different display color by display color, the color balance in the transmission mode display can be changed. In case where the best color balance in reflection mode differs from that in transmission mode, the color balances in reflection mode and transmission mode can be changed. This can ensure liquid crystal display in such a way that the color balance becomes optimal in both modes.

The areas of the openings in pixels can be set for each display color.

As the liquid crystal display is constructed in such a way that the areas of the openings in pixels differ display color by display color, the color balance in the transmission mode display can be changed. In case where the best color balance in reflection mode differs from that in transmission mode, the color balances in reflection mode and transmission mode can be changed. This can ensure liquid crystal display in such a way that the color balance becomes optimal in both modes.

The mode of a liquid crystal molecular alignment of the liquid crystal layer can be one of a homogeneous type, homeotropic type, a TN type, a HAN (Hybrid Aligned Nematic) type and an OCB (Optically Compensated Bend) type.

The luminance of the liquid crystal display in reflection mode and transmission mode can be enhanced regardless of the mode of the liquid crystal molecular alignment of the liquid crystal layer. It is therefore possible to select the liquid crystal mode in accordance with the usage and the production cost.

The mode of a liquid crystal molecular alignment of the liquid crystal layer can be set in an area where the reflection electrode exists and an area of the openings for each area.

The retardation of the liquid crystal layer in reflection mode and transmission mode can be changed by setting the mode of the liquid crystal molecular alignment in reflection mode can be made different from the one in transmission mode. This makes it possible to enhance the output light intensity in both modes.

The liquid crystal display can be constructed in such a way that the transparent electrode is formed on the device substrate and the reflection electrode is formed in contact with the transparent electrode on that side of the liquid crystal layer.

As the reflection electrode is formed on the transparent electrode, the direction of an electric field around each opening can be stabilized. This can suppress the disturbance of the liquid crystal molecular alignment.

A quarter-wave plate can be provided on a liquid crystal layer side of the opposite substrate.

The provision of the quarter-wave plate on the liquid crystal layer side of the opposite substrate can prevent the quarter-wave plate from being deteriorated by external factors, such as the ultraviolet rays and humidity, thereby leading to the elongated life of the liquid crystal display. Because the quarter-wave plate itself is formed of a material aligned that shows a liquid crystallinity, it is possible to eliminate the need for coating of an alignment film and a rubbing process to align the liquid crystal layer. This can contribute to shortening the manufacturing time and reducing the production cost.

The liquid crystal display can be constructed in such a way that second openings are formed in that area of the quarter-wave plate which faces the openings.

With the thickness of the liquid crystal layer optimized for the reflection mode, a higher output light intensity can be acquired in the transmission mode that uses the quarter-wave plate than in the transmission mode that does not use the quarter-wave plate. Forming the second openings in that area of the quarter-wave plate which faces the openings can provide display without the quarter-wave plate in transmission mode, thus making it possible to increase the luminance in transmission mode.

A cholesteric liquid crystal can be provided on an opposite side of the device substrate to the liquid crystal layer.

Because the cholesteric liquid crystal shows the characteristic which is the characteristics of a sheet polarizer and a quarter-wave plate combined together, the use of the cholesteric liquid crystal in place of the sheet polarizer and the quarter-wave plate can contribute to shortening the manufacturing time and reducing the production cost.

A second quarter-wave plate can be provided on a liquid crystal layer side of the device substrate.

The provision of the quarter-wave plate on the liquid crystal layer side of the device substrate can prevent the quarter-wave plate from being deteriorated by external factors, such as the ultraviolet rays and humidity, thereby leading to the elongated life of the liquid crystal display. Because the quarter-wave plate itself is formed of a material aligned that shows a liquid crystallinity, it is possible to eliminate the need for coating of an alignment film and a rubbing process to align the liquid crystal layer. This can contribute to shortening the manufacturing time and reducing the production cost.

A cholesteric liquid crystal can be provided on an opposite side of the device substrate to the liquid crystal layer and a second quarter-wave plate can be provided between the cholesteric liquid crystal and the device substrate.

As the cholesteric liquid crystal and the quarter-wave plate are provided on the opposite side of the device substrate to the liquid crystal layer, it is possible to enhance the output light intensity of the liquid crystal display in reflection mode as well as in transmission mode.

BRIEF DESCRIPTION OF THE DRAWINGS

FIG. 1 is a cross-sectional view of a liquid crystal display according to a first embodiment;

FIGS. 12A and 12B are diagrams showing an azimuth angle dependency of the output light intensity on an anisotropic reflector;

FIG. 14 is a cross-sectional view of a liquid crystal display according to a second embodiment;

FIG. 16 is a cross-sectional view of a liquid crystal display according to a third embodiment;

FIG. 24 is a diagram depicting an embodiment in which a cholesteric liquid crystal is laid on a lower substrate;

FIG. 25 is a diagram depicting an embodiment in which a cholesteric liquid crystal and a quarter-wave plate are laid on a lower substrate;

DETAILED DESCRIPTION OF THE PREFERRED EMBODIMENTS

Figure 2A:
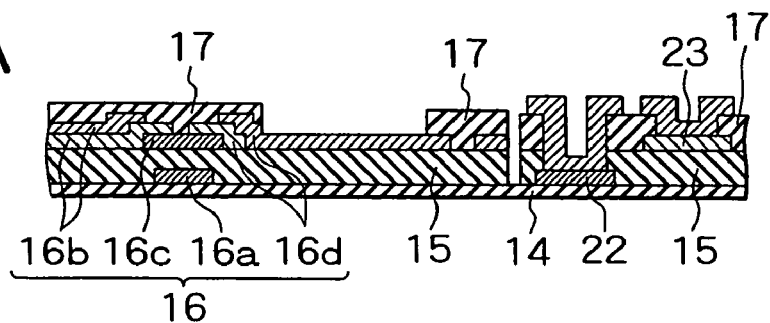
FIGS. 2A through 2F are cross-sectional views illustrating, step by step, a method of manufacturing the liquid crystal display shown in FIG. 1.

Embodiments of the invention will be described below with reference to the accompanying drawings. FIG. 1 is a partial cross-sectional view of a semi-transmission type liquid crystal display according to the first embodiment of the present invention. As shown in FIG. 1, a semi-transmission type liquid crystal display 10 has, inside, a lower substrate 11, an opposite substrate 12 so arranged as to face the lower substrate 11 and a liquid crystal layer 13 sandwiched between the lower substrate 11 and the opposite substrate 12.

The semi-transmission type liquid crystal display 10 employs an active matrix system which has, for example, thin film transistors (TFTs) provided as switching elements pixel by pixel.

The lower substrate 11 has an insulative substrate 14, an insulating protection film 15, TFTs 16, an insulating layer 17, projection patterns 18, a second insulating layer 19 and a reflection electrode 20. The insulating protection film 15 is deposited on the insulative substrate 14 and the TFTs 16 are formed on the insulating protection film 15. Each TFT 16 has a gate electrode 16a on the insulative substrate 14, a drain electrode 16b, a semiconductor layer 16c and a source electrode 16d, the last three electrodes lying on the insulating protection film 15 covering the gate electrode 16a.

The projection patterns 18 are formed on the insulating protection film 15 and the TFT 16 via the first insulating layer 17 or the source electrode 16d of the TFT 16. The second insulating layer 19 is deposited, covering the projection patterns 18, the first insulating layer 17 and the source electrode 16d. A contact hole 21 reaching the source electrode 16d is bored in the second insulating layer 19.

Further, the reflection electrode 20 is deposited, covering the contact hole 21 and the second insulating layer 19. The reflection electrode 20 is connected to the source electrode 16d of the TFT 16 and has a function as a reflector and a pixel electrode. The projection patterns 18 and the second insulating layer 19 cause the reflection electrode 20 to have an undulated surface. The reflection electrode 20 is removed from non-effective areas on the undulated surface of the reflection electrode 20 which are equivalent to the top portions and bottom portions, thereby forming openings 27 in the second insulating layer 19. The "non-effective area" mentioned here is an area on the undulated surface of the reflection electrode 20 where it is difficult to efficiently reflect external light toward a viewer.

A gate terminal portion 22 on the insulative substrate 14 and a drain terminal portion 23 on the insulating protection film 15 covering the gate terminal portion 22 are formed in a terminal area provided in the peripheral portion of the lower substrate 11.

The opposite substrate 12 has a transparent electrode 24, a color filter 25 and an insulative substrate 26 laminated in order from that side of the liquid crystal layer 13. Incident light Li input to the opposite substrate 12 from the insulative substrate 26 travels from the opposite substrate 12 and reaches the lower substrate 11 through the liquid crystal layer 13, and is reflected at the reflection electrode 20 to become reflected light Lr. The reflected light Lr travels through the liquid crystal layer 13 again and comes out of the opposite substrate 12 from the transparent electrode 24.

FIGS. 2A through 2F are explanatory diagrams showing a reflection electrode fabricating process in the process of manufacturing the semi-transmission type liquid crystal display shown in FIG. 1. As shown in FIG. 2A, first, the TFT 16 as a switching element is formed.

The gate electrode 16a is formed on the insulative substrate 14 and the insulating protection film 15 is deposited. Then, the drain electrode 16b, the semiconductor layer 16c and the source electrode 16d are formed on the insulating protection film 15. Further, the first insulating layer 17 is deposited, covering the TFT 16.

The switching element is not limited to the TFT 16 but a substrate for other switching elements, such as a diode, may be prepared as well.

Figure 2B:
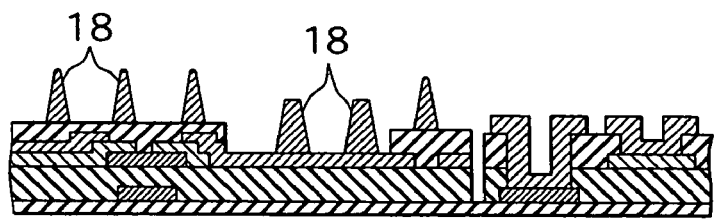

Next, as shown in FIG. 2B, an organic resin is applied onto the first insulating layer 17, after which exposure and developing processes are carried out to form a plurality of projection patterns 18 for forming the undulation pattern on the surface of the reflection electrode 20 using a projection pattern forming mask.

Figure 2C:
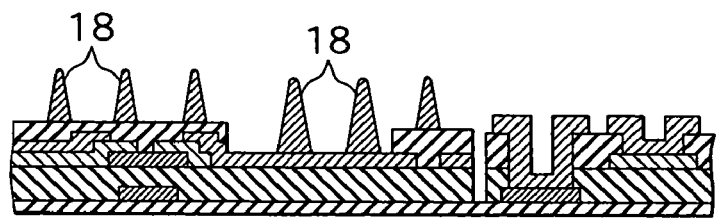

Then, as shown in FIG. 2C, the organic resin is baked. The baking makes the corner portions of the organic resin round.

Figure 2D:
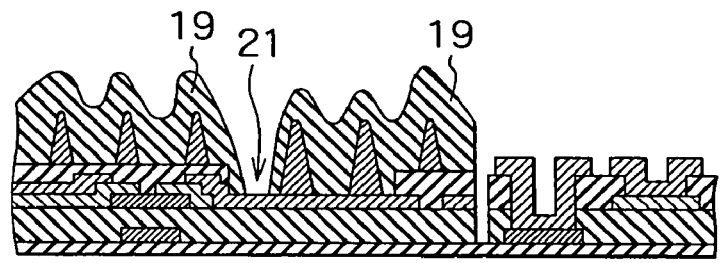

Next, an interlayer film of an organic resin is applied in such a way as to cover the projection patterns 18 to yield a smooth undulated shape. Then, exposure and developing processes are carried out to bore the contact hole 21. Thereafter, the interlayer film is baked to form the second insulating layer 19 as shown in FIG. 2D.

Figure 2E:
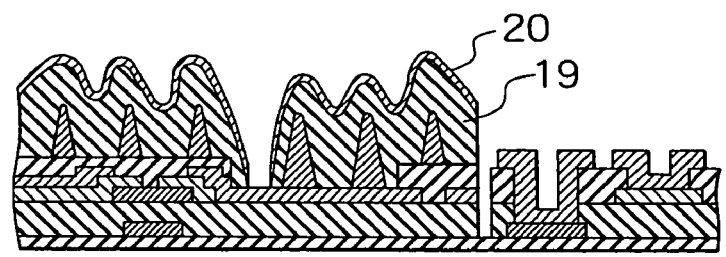

Next, as shown in FIG. 2E, the reflection electrode 20 which is an aluminum (Al) thin film covering the contact hole 21 and the second insulating layer 19 is formed in association with the forming position of the reflection electrode 20.

Figure 2F:
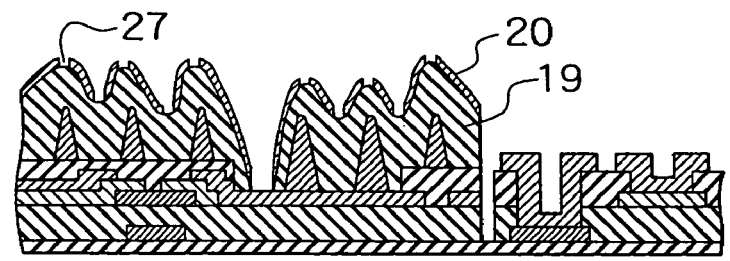

Thereafter, as shown in FIG. 2F, with a mask corresponding to the top portions and bottom portions of the undulated surface of the reflection electrode 20, exposure and developing processes are carried out using a photoresist to remove top portions and bottom portions of the reflection electrode 20, thereby forming the openings 27.

The material for the reflection electrode 20 is not limited to Al, but conductive materials, such as Ag, may be used as well. Because the shape of the undulated surface of the reflection electrode 20 is determined by the pattern of the projection patterns 18, the pattern of the mask that is used at the time of forming the openings 27 is generated based on the projection pattern forming mask used in FIG. 2B.

In the reflection electrode fabricating process, the organic interlayer film (undulated layer) between the Al film and the TFT substrate may be formed by a single layer instead of two layers. At the time of forming the openings 27 in FIG. 2F, the second insulating layer 19 around the openings 27 can be partially etched out so that light from a backlight 28 can pass efficiently.

Figure 3A:
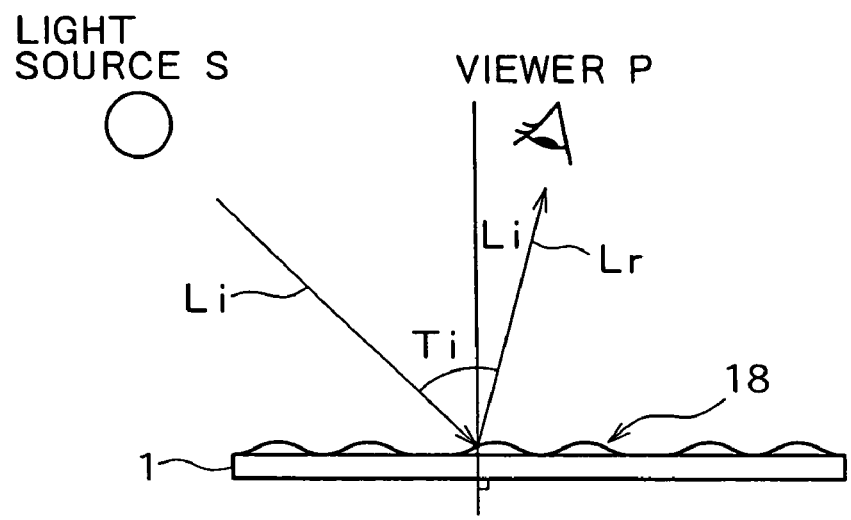
FIGS. 3A and 3B are exemplary diagrams showing the relationship between input light and reflected light.

Next, an area where the openings 27 are formed will be discussed. FIG. 3A exemplarily shows the light Li which is input to a reflector 1 where the openings 27 are not formed and the light Lr which is reflected at the reflector 1 to be seen by a viewer. Let an incident angle Ti and a reflection angle Tr be the angles formed by the incident light Li and the reflected light Lr with respect to the normal direction of the reflector 1. As the incident angle Ti is reflected at the Al layer formed in an undulated pattern by the projection patterns 18 and the insulating layer, the incident angle Ti and the reflection angle Tr take different values.

Figure 3B:
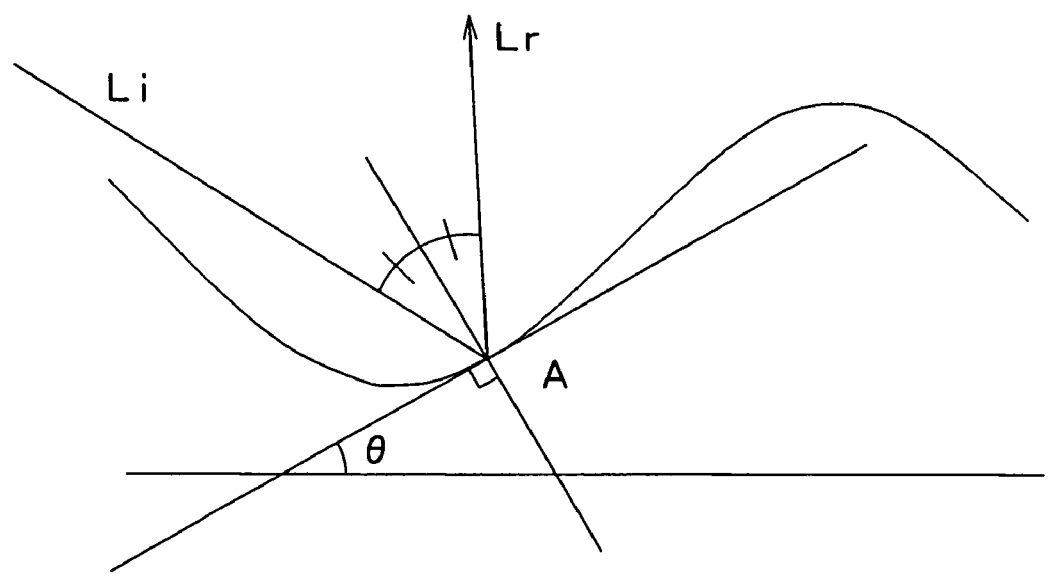

FIG. 3B is a diagram exemplarily showing the reflection of light incident to one point A on the Al layer having undulations. FIG. 3B shows only the surface shape of the Al layer and the reflector 1 for the sake of simplicity. In case where the incident light Li is input to the point A on the undulations, the light is reflected at the point A on the contact surface of the Al layer, so that the reflected light Lr is reflected with the normal direction at the point A as a symmetrical axis. Given that the angle formed by the contact surface of the Al layer and the reflector 1 at the point A is defined as a tilt angle θ at the point A, the distribution of the incident light Li in the direction of reflection depends on the distribution of the tilt angle θ of the undulations of the Al layer. Therefore, it is important to design the distribution of the tilt angle θ in such a way that a viewer P subjectively evaluates the luminance of the reflector 1 and recognizes the reflection as bright reflection.

Figure 4:
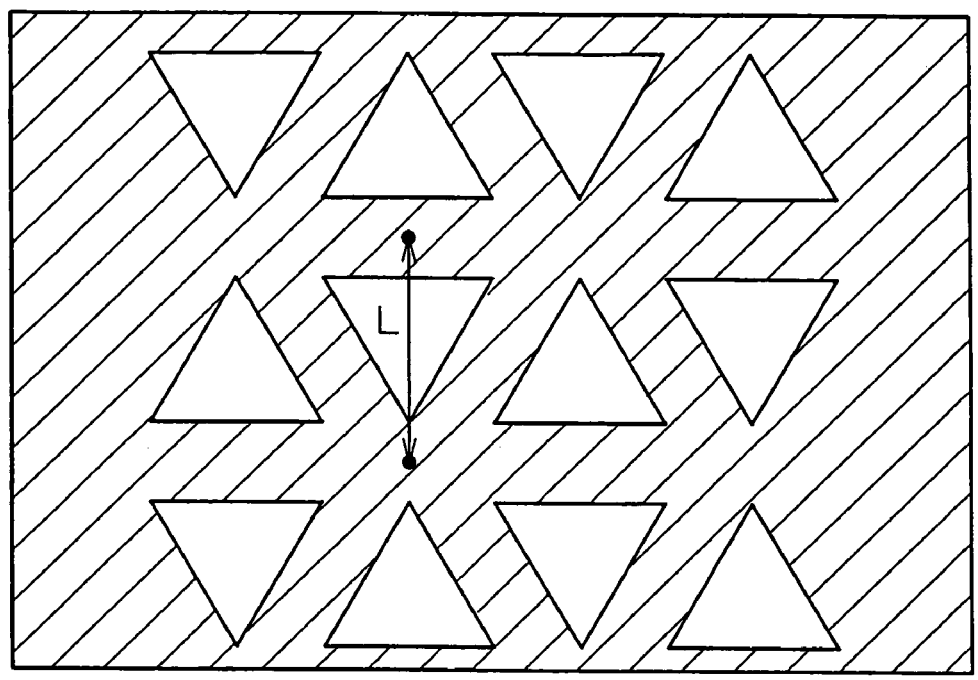
FIG. 4 is a plan view of projection patterns on a reflector.

A description will now be given of the design of the undulation pattern formed on the surface of the reflector 1 by the projection patterns 18 and the second insulating layer 19. FIG. 4 two-dimensionally shows the projection patterns formed on the reflector, and the hatched portion in the diagram is an area where the projection patterns 18 are formed. Actually, a plurality of projection patterns are laid out with a certain roughness, yielding the layout of triangles. Although the example shows the projection patterns forming the sides of a plurality of triangles, the undulation pattern may take any form as long as a plurality of line-like projection patterns form a closed figure, such as a rectangle or an ellipsis.

Figure 5:
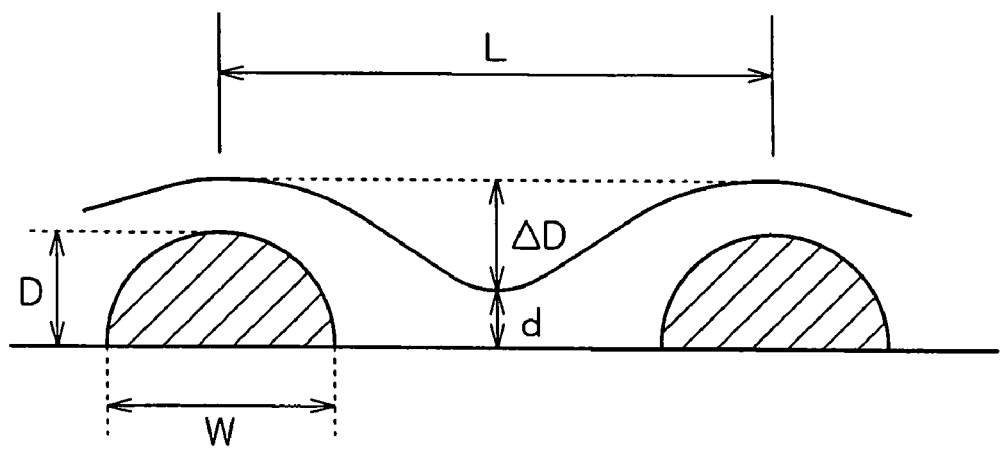
FIG. 5 is a cross-sectional view of the projection patterns.

FIG. 5 exemplarily shows a cross-sectional view of the projection patterns between two points in FIG. 4. Let L be the center distance of the projection patterns 18, W be the width of the projection patterns 18, D be the height of the projection patterns 18, d be the height at which the height of the second insulating layer 19 becomes minimum and ΔD be a height difference between a point at which the height of the second insulating layer 19 becomes maximum and a point at which the height of the second insulating layer 19 becomes minimum. A the Al film (reflection electrode 20) coated on the top surface of the second insulating layer 19 is very thin, its thickness is neglected and not shown.

Figure 6:
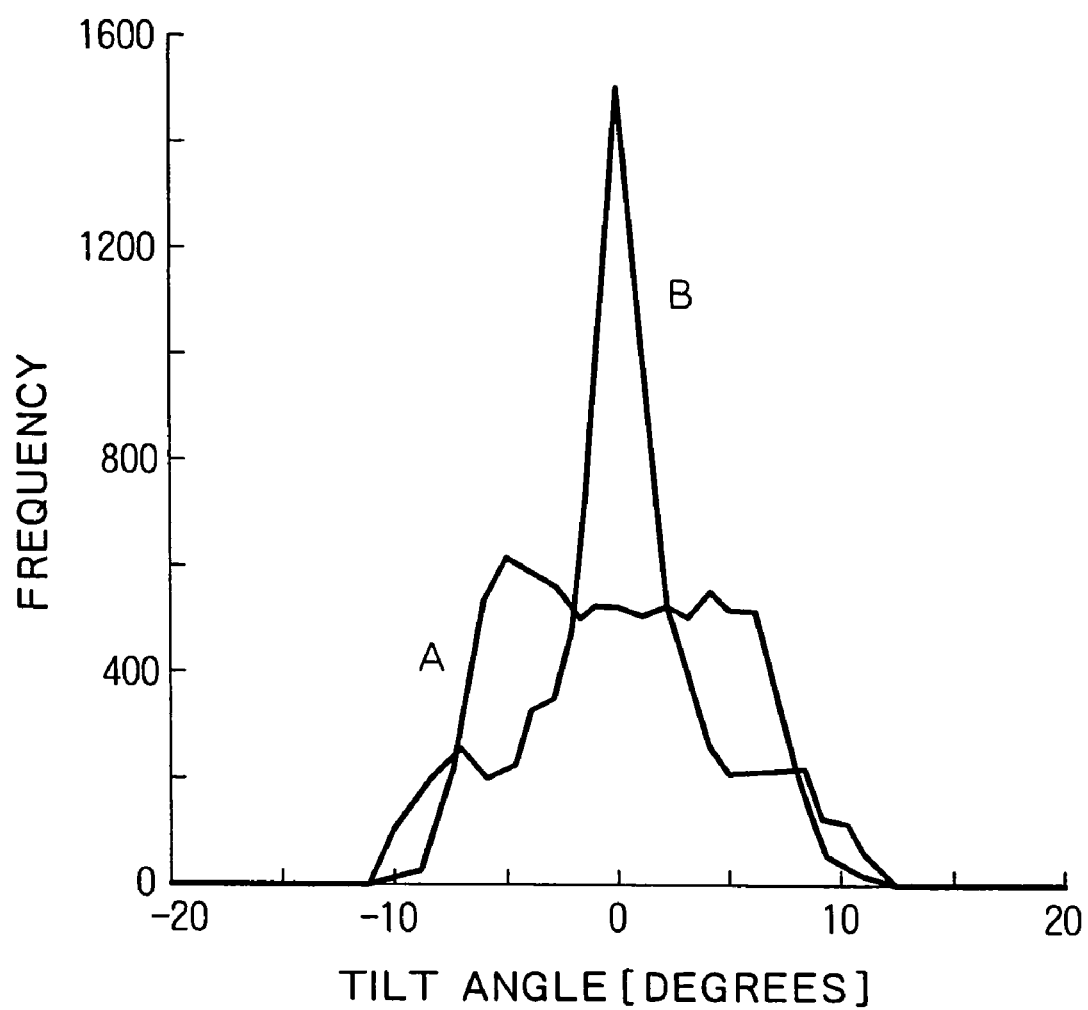
FIG. 6 is a graph showing the distribution of tilt angle.

The reflectors 1 were prepared by variously changing the values of the parameters of the projection patterns 18, L, W, D, d and ΔD, and were used in a reflection type liquid crystal display plate with no openings 27 formed therein, and a viewer made subjective evaluation on the luminance and interference. FIG. 6 shows the results of the evaluation on the distribution of the tilt angle for each of the reflectors which had good results on the subjective evaluation and those which had bad results. A graph A is the distribution of the tilt angle for the good results and the tilt angle ranging from 2 degrees to 10 degrees occupies 50% or more. A graph B is the distribution of the tilt angle for the poor results and the tilt angle of 0 degree occupies 15% or more.

By setting the parameters D, W, ΔD, d and L to control the distribution of the tilt angle, the luminance in the direction toward the viewer P for the reflection type liquid crystal display which has a directivity to the direction of light reflection can be improved.

The area of the reflection electrode 20 where the tilt angle θ lies in a range of 0 degree to 2 degrees reflects the light input from the normal direction of the reflector 1 in the normal direction, so that it causes such light reflection as to show the image of the viewer P. This area does not contribute much to an improvement of the luminance of the liquid crystal display. The area of the reflection electrode 20 where the tilt angle θ lies in a range of 10 degree or greater is not likely to reflect external light toward the viewer P and does not contribute much to an improvement of the luminance of the liquid crystal display. In the following description, the areas where the tilt angle θ is 0 to 2 degrees and 10 degree or greater are called non-effective areas.

As the openings 27 are formed by removing the reflection electrode 20 at the non-effective areas, the light from the backlight 28 is transmitted through the openings 27. In this case, the first insulating layer 17, the projection patterns 18 and the second insulating layer 19 are formed of transparent materials.

The areas where the tilt angle θ is 0 to 2 degrees are equivalent to the top portions and bottom portions of the undulated surface and the areas where the tilt angle θ is equal to or greater than 10 degrees are equivalent to the polar changing portions of the undulations. Because the non-effective areas are determined by the parameters D, W, ΔD, d and L as shown in FIG. 5, therefore, a mask pattern corresponding to the non-effective areas can be generated based on the pattern of the projection pattern forming mask used in FIG. 2B.

Figure 7:
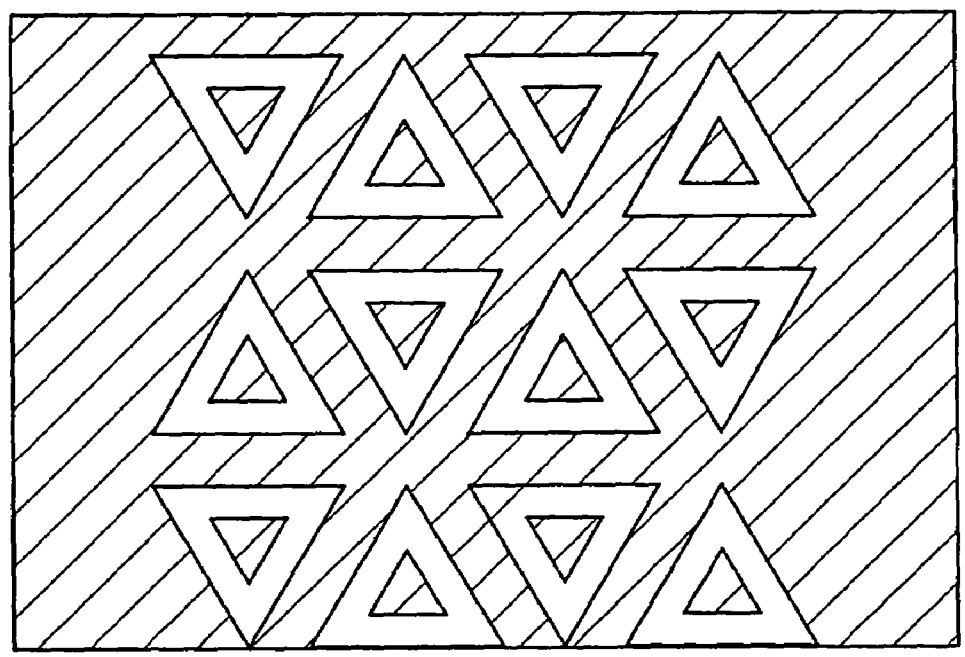
FIG. 7 is a plan view of a non-effective area pattern for forming openings.

If the projection patterns 18 are formed by using the projection pattern forming mask as shown in FIG. 4, the non-effective areas become what is indicated by the hatched portion in FIG. 7. Therefore, a mask having the shape of the hatched portion in FIG. 7 is applied onto the reflector 1 and the non-effective areas of the reflection electrode 20 are removed by photoresisting and etching, thus forming the openings 27. The removal of the reflection electrode 20 by etching is likely to increase the removed area due to overetching progressed depending on the etching conditions. In this respect, it is desirable that the mask with the shape of the hatched portion in FIG. 7 should be targeted for the areas where the tilt angle θ is 0 to 2 degrees and the areas where the tilt angle θ is equal to or greater than 10 degrees.

Figure 8:
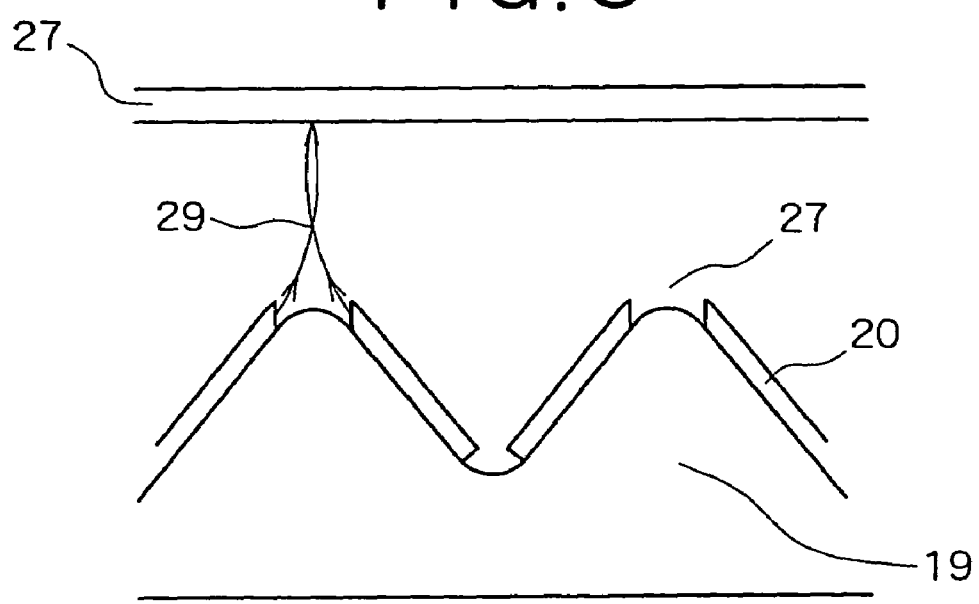
FIG. 8 is a diagram depicting the direction of an electric field around an opening.

An electrode for generating an electric field on the liquid crystal layer 13 does not exist in the openings 27 so that the electric field around the openings 27 of the liquid crystal layer 13 is disturbed. Because the size of the openings 27 is about several micrometers, however, the direction of the electric field, 29, around the openings 27 is the direction in which an electric field generated effectively acts between the end portion of the reflection electrode 20 and the transparent electrode 24 of the opposite substrate 12, as shown in FIG. 8. The formation of the openings 27 in the non-effective areas does not therefore significantly deteriorate the display characteristics of the semi-transmission type liquid crystal display.

Figure 9:
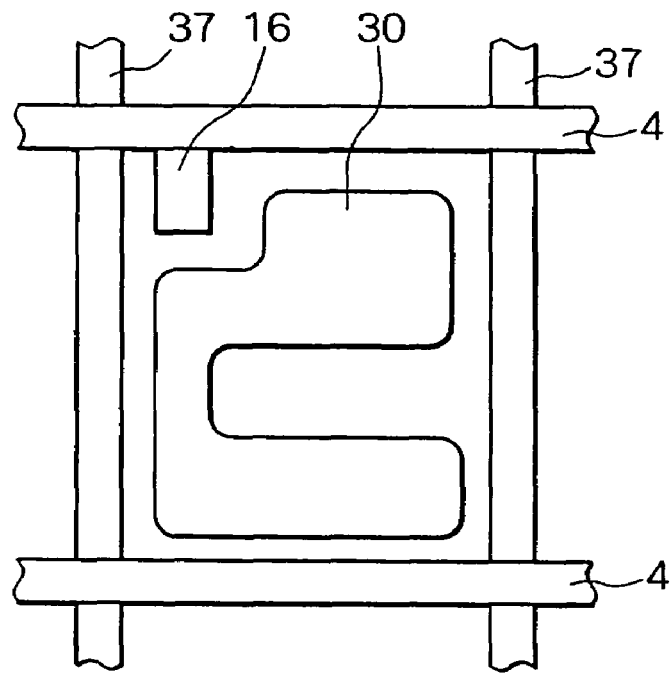
FIG. 9 is a diagram showing the structure of one pixel of the liquid crystal display.

The planar distribution of the openings 27 will now be discussed. FIG. 9 is a plan view exemplarily showing one pixel of the semi-transmission type liquid crystal display in enlargement, and shows that one pixel of the semi-transmission type liquid crystal display is comprised of the gate interconnections 4, drain interconnections 37, the TFT 16 and the storage capacitor 30. The storage capacitor 30 is a capacitance component formed by arranging the storage capacitor interconnection and the drain electrode 16b in such a way as to face each other via the insulating protection film 15 and serves to suppress a variation in voltage as it is inserted in parallel to the liquid crystal. The first insulating layer 17, the projection patterns 18, the second insulating layer 19 and the reflection electrode 20 are formed on the pixel area shown in FIG. 8. Although FIG. 9 illustrates a common storage type layout, other layouts, such as a gate storage layer, can be employed without raising any problem.

Because the gate interconnections 4, the drain interconnections 37, the TFT 16 and the storage capacitor interconnection that constitutes the storage capacitor 30 are generally not formed of transparent materials, the light from the backlight 28 cannot be transmitted. Even if the openings 27 are formed in the areas where the reflection electrode 20 overlaps the gate interconnections 4, the drain interconnections 37, the TFTs 16 and the storage capacitor 30, therefore, the amount of transmitted light does not increase. Therefore, the mask pattern is produced so as not to form the openings 27 in the areas that overlap the gate interconnections 4, the drain interconnections 37, the TFTs 16 and the storage capacitor 30 and photoresisting and etching are carried out using the mask pattern. It is to be noted that such is not essential in case where the storage capacitor 30 is formed of a transparent material, such as ITO.

In general, as a filter of red (R), green (G) or blue (B) is used in the color filter 25 of the opposite substrate 12, the liquid crystal display makes color display by expressing RGB. In the above-described semi-transmission type liquid crystal display, the intensity balance of the RGB colors is determined with the reflection mode, taken as a reference, that turns off the backlight 28 and provides display with reflected light. When the area of the openings 27 formed in the pixels is identical in the RGB colors, the intensity balance of the RGB colors in the TM that turns on the backlight 28 and provides display with transmitted light becomes similar to the intensity balance in reflection mode.

Figure 10:
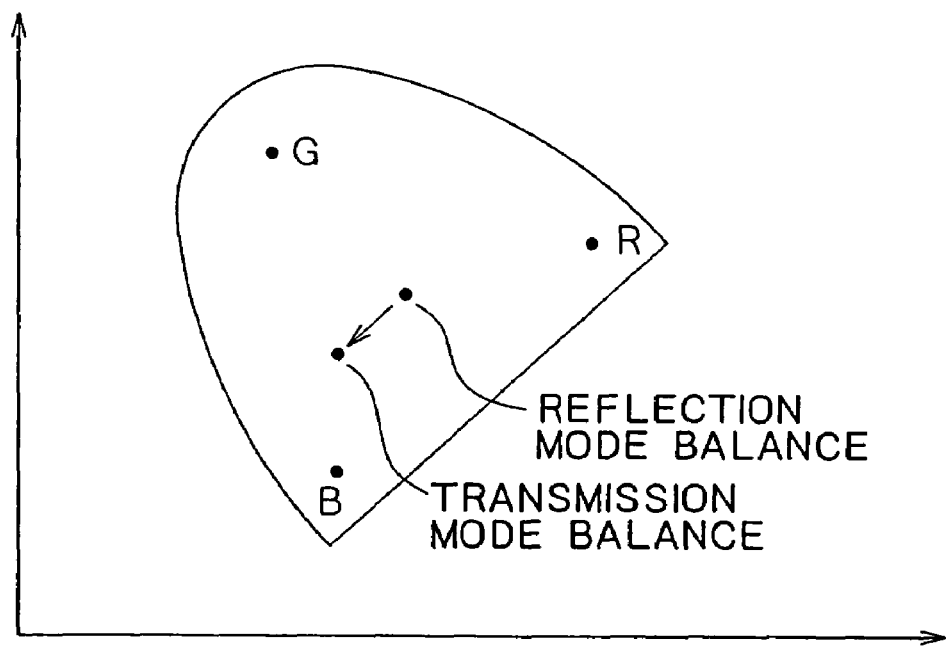
FIG. 10 is a diagram showing the color balances in reflection mode and transmission mode in color coordinates.
Figure 11:
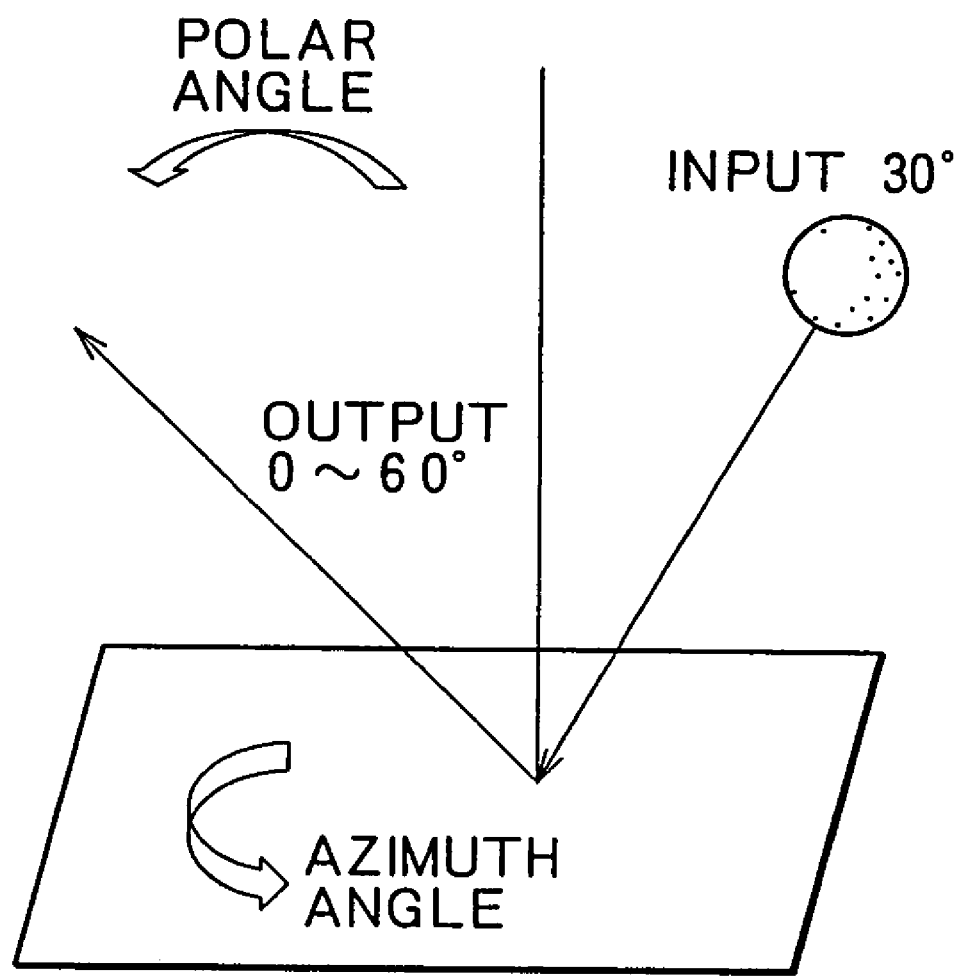
FIG. 11 is a cross-sectional view showing the reflector, a polar angle and an azimuth angle.

However, the use environment differs in both modes; for example, the reflection mode is used when the ambient area is bright and the transmission mode is used when the ambient area is dark. Therefore, the fatigue the viewer P feels at the time of viewing the liquid crystal display can be reduced by setting the intensity of blue (B) so as to set the color temperature of the transmission mode balance higher than that of the reflection mode balance as shown in the color coordinates in FIG. 10, rather than setting the same RGB intensity balance for both modes.

At the time the openings 27 are formed, therefore, for the reflection electrode 20 of the pixels where the blue (B) color filter 25 is laid, the area of one opening 27 is increased or the number of the openings 27 in the pixels is increased to adjust the amount of to-be-transmitted light from the backlight 28, thereby setting the color temperature higher. Likewise, the red (R) or green (G) intensity can also be adjusted in accordance with the use environment of the liquid crystal display and the adjustment is substantially the same as that in the case of enhancing blue (B).

The method which determines the reflection characteristics of the reflection type liquid crystal display and is becoming standard in the industry is the method of inputting light at an angle of 30 degrees from the normal direction of the reflector and measuring the relationship between the polar angle, defined by the incident light and the normal direction of the reflector, and the reflection light intensity in case where the angle with the normal direction of the reflector as the center is taken as the azimuth angle. From the viewpoint of improving the visibility of the liquid crystal display in use, it is required to design the reflector in such a way as to enhance the reflection light intensity at a polar angle of 0 degree (normal direction) under the above conditions.

Checking the relationship between the azimuth angle and the reflection light intensity after light is irradiated on the reflector on which the projection patterns 18 having triangles as basic figures as shown in FIG. 7 are formed from the direction of a polar angle of 30 degrees it is seen that the reflection light intensity periodically changes as shown in FIGS. 12A and 12B. Hereinafter, the reflector that has such projection patterns as to change the reflection light intensity according to the azimuth angle is called an anisotropic reflector while the reflector that has projection patterns which do not change the reflection light intensity according to the azimuth angle is called an isotropic reflector. The reason why the anisotropic reflector increases the reflection light intensity in a specific direction is that the distribution in the normal direction at the undulations of the surface of the reflector is not uniform.

Figure 13A:
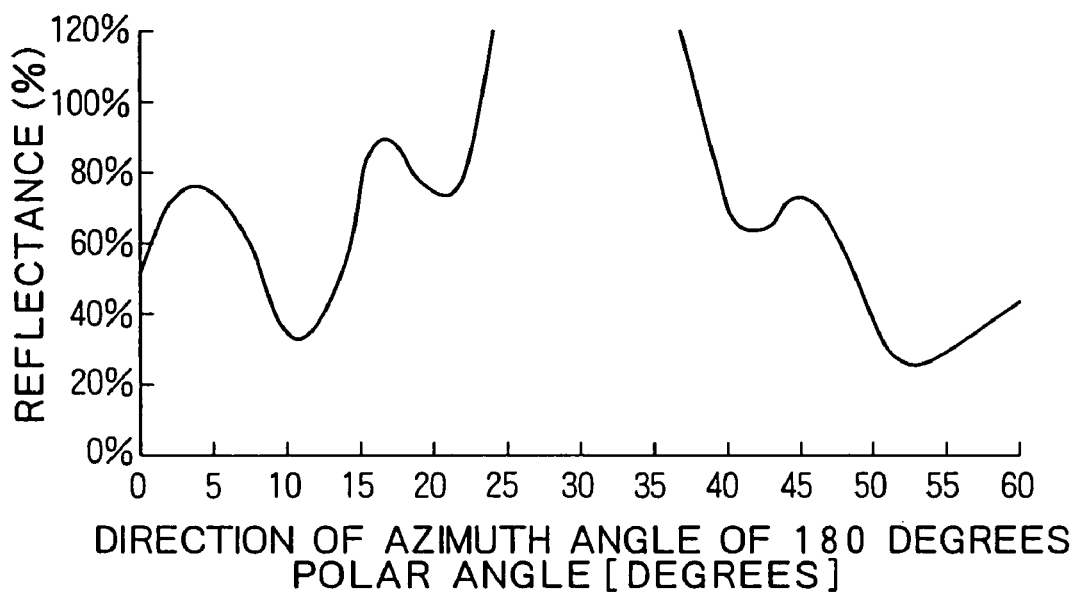
FIGS. 13A and 13B are diagrams showing an improvement on the reflected light intensity at the anisotropic reflector at an azimuth angle of 180 degrees.
Figure 13B:
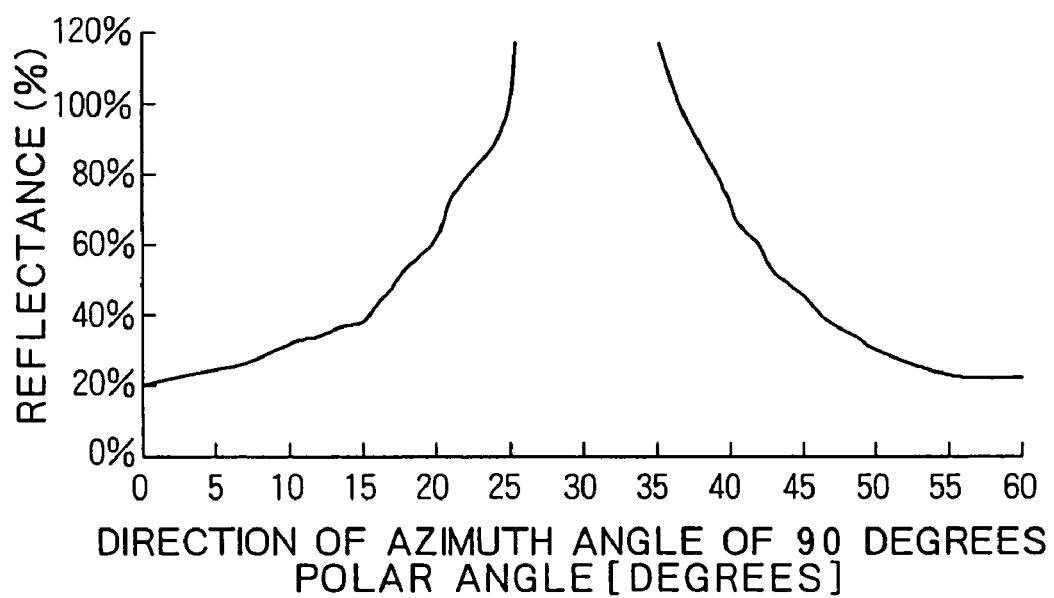

Light was irradiated on the reflector on which the projection patterns 18 having basic figures of triangles are formed from the direction of a polar angle of 30 degrees and an azimuth angle of 0 degree, and the relationship between the polar angle and the reflection light intensity was measured at an azimuth angle of 90 degrees which was horizontal to the light source and at an azimuth angle of 180 degrees to the light source and by using the spectrometer IMUC (LCD 7000) of Otsuka Electronics Co., Ltd. At this time, light was input from one top of one of the basic triangles and one side of each triangle was arranged to be horizontal to the spectrometer. FIG. 13A shows the results of measuring in the direction of an azimuth angle of 180 degrees and FIG. 13B shows the results of measuring in the direction of an azimuth angle of 90 degrees. It is seen that the measuring results in the direction of an azimuth angle of 90 degrees becomes the distribution of the reflection light intensity with a peak at a polar angle of 30 degrees and the measuring results in the direction of an azimuth angle of 180 degrees becomes the distribution of the reflection light intensity with peaks in the vicinity of a polar angle of 30 degrees and a polar angle of 5 degrees. It is apparent that the reflection light intensity at a polar angle of 0 degree is greater at an azimuth angle 180 degrees than at an azimuth angle 90 degrees. The seems to be have occurred as the anisotropic reflection characteristic shown in FIG. 7 causes the reflection light intensity to have a peak value near a polar angle of 5 degrees in the measurement at an azimuth angle 180 degrees.

Because the reflection light intensity depends on the azimuth angle due to anisotropic projection patterns, as mentioned above, the polar angle dependency of the reflection light intensity takes a plurality of peak values. It was confirmed that as the peaks appeared near a polar angle of 0 to 10 degrees, the reflection light intensity at a polar angle of 0 degree would be improved.

FIG. 14 is a partial cross-sectional view of a semi-transmission type liquid crystal display according to the second embodiment of the invention. As shown in FIG. 14, a semi-transmission type liquid crystal display 10 has, inside, a lower substrate 11, an opposite substrate 12 so arranged as to face the lower substrate 11 and a liquid crystal layer 13 sandwiched between the lower substrate 11 and the opposite substrate 12.

The lower substrate 11 has an insulative substrate 14, an insulating protection film 15, TFTs 16, an insulating layer 17, projection patterns 18, a second insulating layer 19, a reflection electrode 20 and a transparent electrode 31. The insulating protection film 15 is deposited on the insulative substrate 14 and the TFTs 16 are formed on the insulating protection film 15. Each TFT 16 has a gate electrode 16a on the insulative substrate 14, a drain electrode 16b, a semiconductor layer 16c and a source electrode 16d, the last three electrodes lying on the insulating protection film 15 covering the gate electrode 16a.

The projection patterns 18 are formed on the insulating protection film 15 and the TFT 16 via the first insulating layer 17 or the source electrode 16d of the TFT 16. The second insulating layer 19 is deposited, covering the projection patterns 18, the first insulating layer 17 and the source electrode 16d. A contact hole 21 reaching the source electrode 16d is bored in the second insulating layer 19.

Further, the transparent electrode 31 and the reflection electrode 20 are deposited, covering the contact hole 21 and the second insulating layer 19. The reflection electrode 20 is connected to the source electrode 16d of the TFT 16 and has a function as a reflector and a pixel electrode. The transparent electrode 31 is a transparent electric conductor, such as ITO, and is electrically connected to the reflection electrode 20 so that the transparent electrode 31 serves as a pixel electrode. The projection patterns 18 and the second insulating layer 19 cause the reflection electrode 20 to have an undulated surface. The reflection electrode 20 is removed from non-effective areas on the undulated surface of the reflection electrode 20 which are equivalent to the top portions and bottom portions, thereby forming openings 27 in the storage capacitor 30. The "non-effective area" mentioned here is an area on the undulated surface of the reflection electrode 20 where it is difficult to efficiently reflect external light toward a viewer.

A gate terminal portion 22 on the insulative substrate 14 and a drain terminal portion 23 on the insulating rotection film 15 covering the gate terminal portion 22 are formed in a terminal area provided in the peripheral portion of the lower substrate 11.

The opposite substrate 12 has a transparent electrode 24, a color filter 25 and an insulative substrate 26 laminated in order from that side of the liquid crystal layer 13. Incident light Li input to the opposite substrate 12 from the insulative substrate 26 travels from the opposite substrate 12 and reaches the lower substrate 11 through the liquid crystal layer 13, and is reflected at the reflection electrode 20 to become reflected light Lr. The reflected light Lr travels through the liquid crystal layer 13 again and comes out of the opposite substrate 12 from the transparent electrode 24.

Figure 15A:
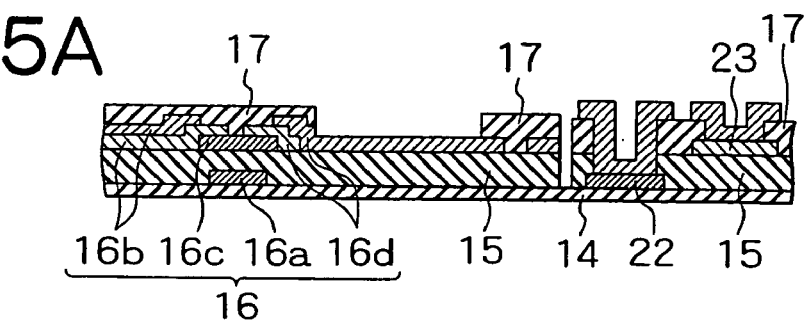
FIGS. 15A through 15F are cross-sectional views illustrating, step by step, a method of manufacturing the liquid crystal display shown in FIG. 14.

FIGS. 15A through 15F are explanatory diagrams showing a reflection electrode fabricating process in the process of manufacturing the semi-transmission type liquid crystal display shown in FIG. 14. As shown in FIG. 15A, first, the TFT 16 as a switching element is formed.

The gate electrode 16a is formed on the insulative substrate 14 and the insulating protection film 15 is deposited. Then, the drain electrode 16b, the semiconductor layer 16c and the source electrode 16d are formed on the insulating protection film 15. Further, the first insulating layer 17 is deposited, covering the TFT 16.

The switching element is not limited to the TFT 16 but a substrate for other switching elements, such as a diode, may be prepared as well.

Figure 15B:
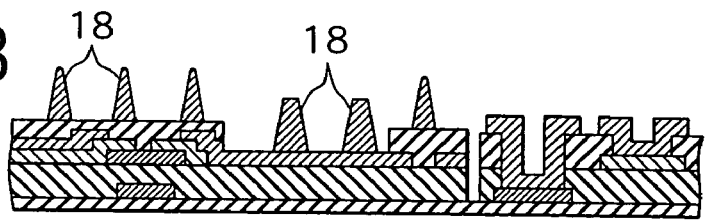

Next, as shown in FIG. 15B, an organic resin is applied onto the first insulating layer 17, after which exposure and developing processes are carried out to form a plurality of projection patterns 18 for forming the undulation pattern on the surface of the reflection electrode 20 using a projection pattern forming mask.

Figure 15C:
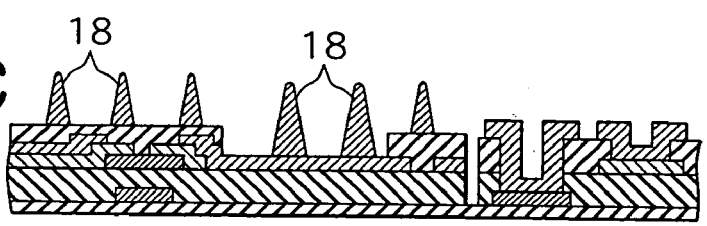

Then, as shown in FIG. 15C, the organic resin is baked. The baking makes the corner portions of the organic resin round.

Next, an interlayer film of an organic resin is applied in such a way as to cover the projection patterns 18 to yield a smooth undulated shape. Then, exposure and developing processes are carried out to bore the contact hole 21.

Figure 15D:
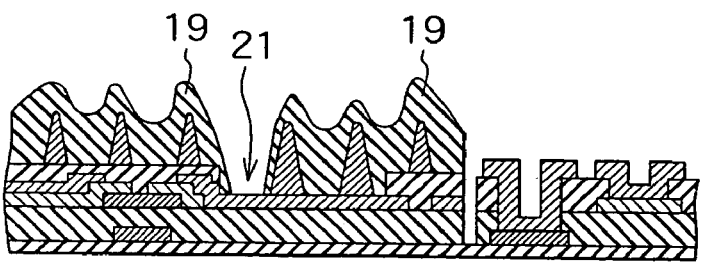

Thereafter, the interlayer film is baked to form the second insulating layer 19 as shown in FIG. 15D.

Figure 15E:
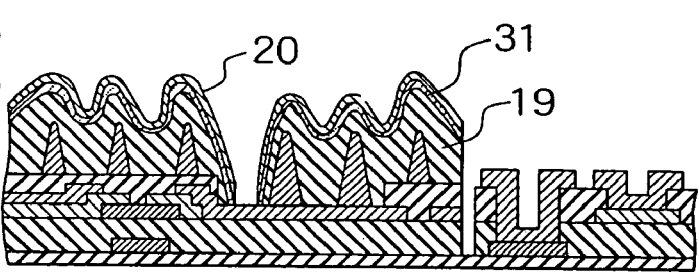

Next, as shown in FIG. 15E, the transparent electrode 31 of ITO is formed on the second insulating layer 19 in association with the forming position of the reflection electrode 20, after which the reflection electrode 20 which is an aluminum (Al) thin film covering the contact hole 21 and the second insulating layer 19 is formed.

Figure 15F:
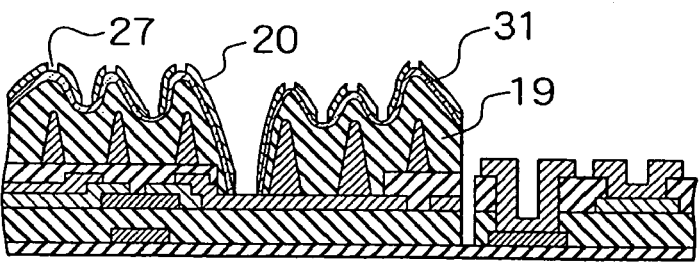

Thereafter, as shown in FIG. 15F, with a mask corresponding to the top portions and bottom portions of the undulated surface of the reflection electrode 20, exposure and developing processes are carried out using a photoresist to remove top portions and bottom portions of the reflection electrode 20, thereby forming the openings 27 as per the first embodiment.

Because the transparent electrode 31 having a function as a pixel electrode is exposed through the openings 27, an electric field is not disturbed even around the openings 27 of the liquid crystal layer 13 so that the display characteristics of the semi-transmission type liquid crystal display will not be deteriorated.

FIG. 16 is a partial cross-sectional view of a semi-transmission type liquid crystal display according to another embodiment of the invention. As shown in FIG. 16, a semi-transmission type liquid crystal display 10 has, inside, a lower substrate 11, an opposite substrate 12 so arranged as to face the lower substrate 11 and a liquid crystal layer 13 sandwiched between the lower substrate 11 and the opposite substrate 12. The semi-transmission type liquid crystal display 10 employs an active matrix system which has, for example, TFTs provided as switching elements pixel by pixel.

The lower substrate 11 has an insulative substrate 14, an insulating protection film 15, TFTs 16, an insulating layer 17, projection patterns 18, a second insulating layer 19, a reflection electrode 20 and a color filter 25. The insulating protection film 15 is deposited on the insulative substrate 14 and the TFTs 16 are formed on the insulating protection film 15. Each TFT 16 has a gate electrode 16a on the insulative substrate 14, a drain electrode 16b, a semiconductor layer 16c and a source electrode 16d, the last three electrodes lying on the insulating protection film 15 covering the gate electrode 16a.

The color filter 25 is deposited on the insulating protection film 15 and the TFT 16 via the first insulating layer 17 or the source electrode 16d of the TFT 16 and projection patterns 18 are formed on the color filter 25. The second insulating layer 19 is deposited, covering the projection patterns 18, the first insulating layer 17, the source electrode 16d and the color filter 25. A contact hole 21 reaching the source electrode 16d is bored in the second insulating layer 19 and the color filter 25.

Further, the reflection electrode 20 is deposited covering the contact hole 21 and the second insulating layer 19. The reflection electrode 20 is connected to the source electrode 16d of the TFT 16 and has a function as a reflector and a pixel electrode. The projection patterns 18 and the second insulating layer 19 causes the reflection electrode 20 to have an undulated surface. The reflection electrode 20 is removed from non-effective areas on the undulated surface of the reflection electrode 20 which are equivalent to the top portions and bottom portions, thereby forming openings 27 in the second insulating layer 19. The "non-effective area" mentioned here is an area on the undulated surface of the reflection electrode 20 where it is difficult to efficiently reflect external light toward a viewer. A gate terminal portion 22 on the insulative substrate 14 and a drain terminal portion 23 on the insulating protection film 15 covering the gate terminal portion 22 are formed in a terminal area provided in the peripheral portion of the lower substrate 11.

The opposite substrate 12 has a transparent electrode 24, the color filter 25 and an insulative substrate 26 laminated in order from that side of the liquid crystal layer 13. Incident light Li input to the opposite substrate 12 from the insulative substrate 26 travels from the opposite substrate 12 and reaches the lower substrate 11 through the liquid crystal layer 13, and is reflected at the reflection electrode 20 to become reflected light Lr. The reflected light Lr travels through the liquid crystal layer 13 again and comes out of the opposite substrate 12 from the transparent electrode 24.

Figure 17A:
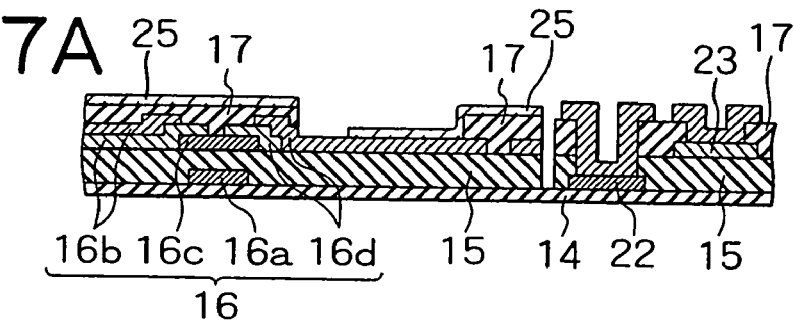
FIGS. 17A through 17F are cross-sectional views illustrating, step by step, a method of manufacturing the liquid crystal display shown in FIG. 16.

FIGS. 17A through 17F are explanatory diagrams showing a step-by-step reflection electrode fabricating process in the process of manufacturing the semi-transmission type liquid crystal display shown in FIG. 16. As shown in FIG. 17A, first, the TFT 16 as a switching element is formed. The gate electrode 16a is formed on the insulative substrate 14 and the insulating protection film 15 is deposited. Then, the drain electrode 16b, the semiconductor layer 16c and the source electrode 16d are formed on the insulating protection film 15. Further, the first insulating layer 17 is deposited, covering the TFT 16. Then, the color filter 25 is deposited on the first insulating layer 17. The switching element is not limited to the TFT 16 but a substrate for other switching elements, such as a diode, may be prepared as well.

Figure 17B:
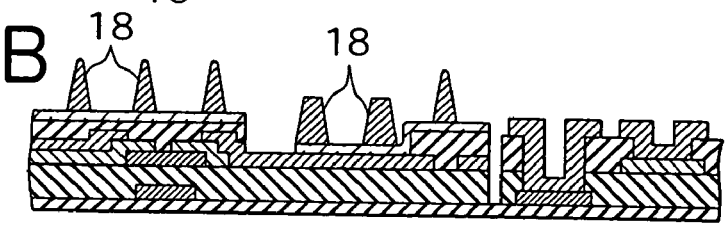

Next, as shown in FIG. 17B, an organic resin is applied onto the color filter 25, after which exposure and developing processes are carried out to form a plurality of projection patterns 18 for forming the undulation pattern on the surface of the reflection electrode 20 using a projection pattern forming mask.

Figure 17C:
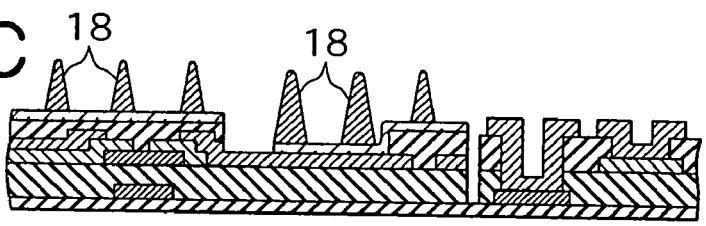

Then, as shown in FIG. 17C, the organic resin is baked. The baking makes the corner portions of the organic resin round.

Figure 17D:
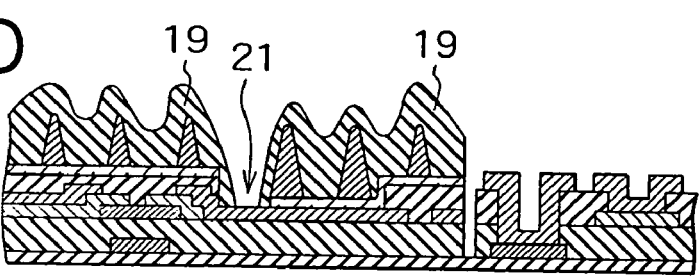

Next, an interlayer film of an organic resin is applied in such a way as to cover the projection patterns 18 to yield a smooth undulated shape. Then, exposure and developing processes are carried out to bore the contact hole 21. Thereafter, the interlayer film is baked to form the second insulating layer 19 as shown in FIG. 17D.

Figure 17E:
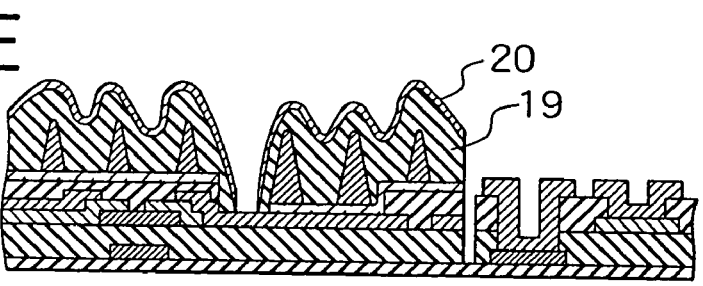

Next, as shown in FIG. 17E, the reflection electrode 20 which is an aluminum (Al) thin film covering the contact hole 21 and the second insulating layer 19 is formed in association with the forming position of the reflection electrode 20.

Figure 17F:
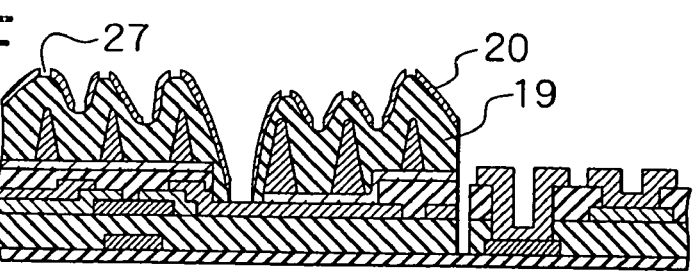
Figure 18A:
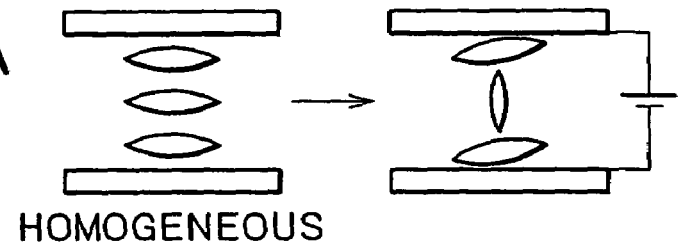
FIGS. 18A through 18E are diagrams showing the directions of alignment of liquid crystal molecules in the modes of a liquid crystal layer.
Figure 18B:
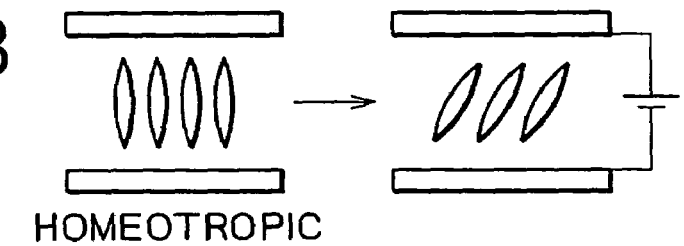
Figure 18C:
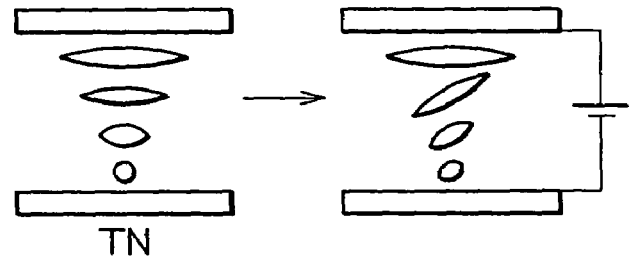
Figure 18D:
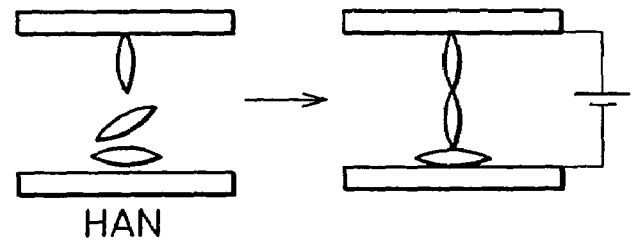
Figure 18E:
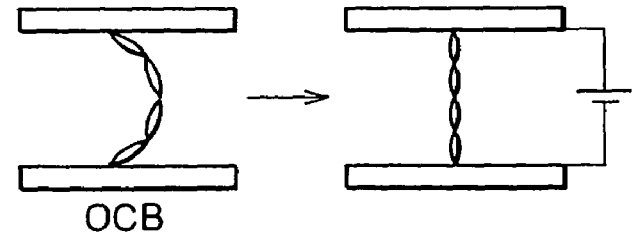

Then, as shown in FIG. 17F, with a mask corresponding to the top portions and bottom portions of the undulated surface of the reflection electrode 20, exposure and developing processes are carried out using a photoresist to remove top portions and bottom portions of the reflection electrode 20, thereby forming the openings 27. The material for the reflection electrode 20 is not limited to Al, but conductive materials, such as Ag, may be used as well. Because the shape of the undulated surface of the reflection electrode 20 is determined by the pattern of the projection patterns 18, the pattern of the mask that is used at the time of forming the openings 27 is generated based on the projection pattern forming mask used in FIG. 17B.

In the reflection electrode fabricating process, the organic interlayer film (undulated layer) between the Al film and the TFT substrate may be formed by a single layer instead of two layers. At the time of forming the openings 27 in FIG. 17F, the second insulating layer 19 around the openings 27 can be partially etched out so that light from a backlight 28 can pass efficiently.

In the display of the reflection mode, input light from the opposite substrate 12 passes the color filter 25 provided on the opposite substrate 12 twice until it becomes output light, In the display of the transmission mode, the light from the backlight 28 passes the color filter 25 provided on the lower substrate 11 and the color filter 25 provided on the opposite substrate 12 until it becomes output light. In reflection and transmission modes, the light passes the color filter twice, so that the liquid crystal display of the third embodiment can make the color expression identical in both modes. It is also possible to determine the balance of colors displayed independently between the transmission mode and reflection mode.

An ECB (Electrically Controlled Birefringence) type, homogeneous type, homeotropic type, TN type, HAN type, OCB type or the like is used for the liquid crystal layers 13 according to the first embodiment and the second embodiment.

FIGS. 18A through 18E are exemplary diagrams showing the directions of alignment of liquid crystal molecules in the liquid crystal modes. Those liquid crystal modes are generally acquired by controlling the alignment direction of the liquid crystal molecules and the pretilt angle by coating an alignment film on the lower substrate 11 after forming a pattern of layers on the lower substrate 11 and rubbing the alignment film in one direction with a cloth or the like or selecting the type of the alignment film.

In case where light reflection by the reflection electrode 20 and light transmission through the openings 27 are used together as in the invention, the light travels in the liquid crystal layer 13 by a distance twice the thickness d of the liquid crystal layer 13 in the reflection section (an area of the reflection electrode 20) as the input light is reflected at the reflector and becomes output light while the light travels in the liquid crystal layer 13 by a distance equal to the thickness d of the liquid crystal layer 13 in the transmission section (an area where the openings 27 are formed) until the input light becomes output light. The difference in light path between the reflection section and the transmission section produces a difference in retardation between the reflection mode and the transmission mode. As the alignment direction of the liquid crystal molecules differs, the refractive index differs in the aforementioned liquid crystal modes. The difference in retardation between the reflection mode and the transmission mode is canceled out by making the alignment directions of the liquid crystal molecules in the reflection electrode 20 and the openings 27 different from each other using the phenomenon.

Figure 19A:
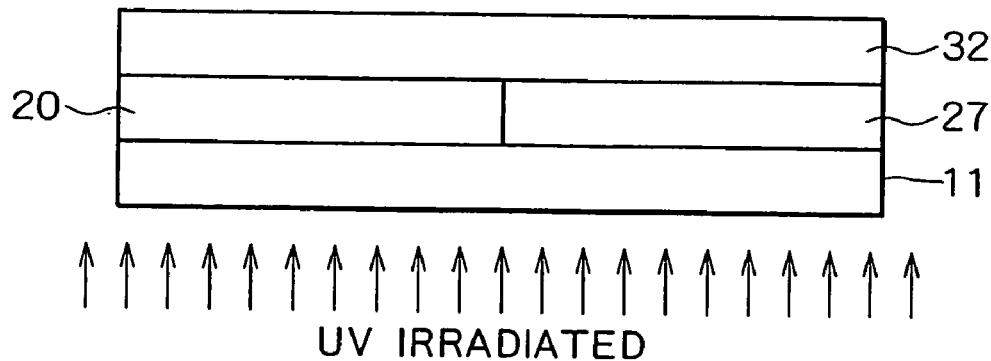
FIGS. 19A to 19C are diagrams showing how to generate the liquid crystal modes of a transmission section and a reflection section.
Figure 19B:
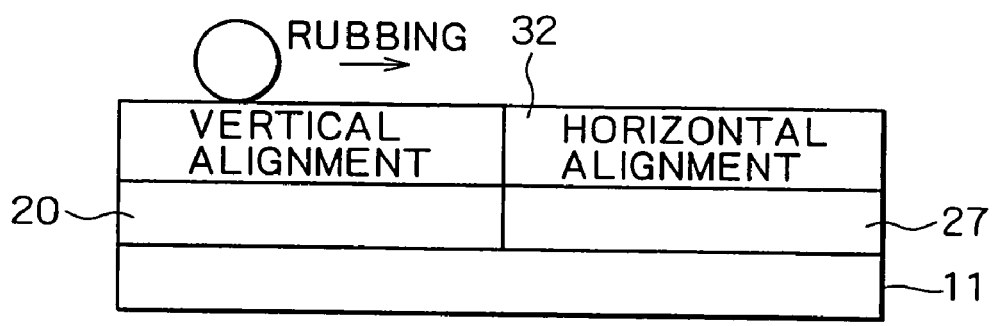
Figure 19C:
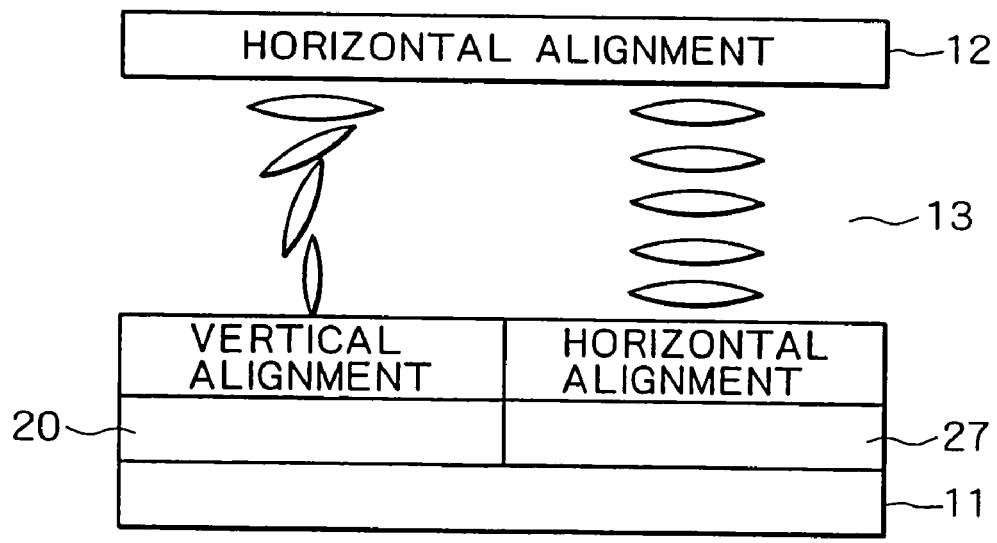

FIGS. 19A to 19C are diagrams exemplarily showing a method of manufacturing a liquid crystal display, which makes the alignment direction of the liquid crystal molecules in the reflection electrode 20 different from the alignment direction of the liquid crystal molecules in the openings 27. As shown in FIG. 19A, polyimide alignment film 32 which provides a pretilt angle of nearly 90 degrees is simultaneously applied to the reflection electrode 20 and the openings 27 of the lower substrate 11, is heated and dried and ultraviolet rays are irradiated from the lower substrate 11. Because of the presence of the reflection electrode 20, the ultraviolet rays are irradiated only on the polyimide alignment film 32 above the openings 27. The irradiation of the ultraviolet rays decomposes the long-chain alkyl group of the polyimide alignment film 32 so that the portion of the liquid crystal which shows the pretilt angle disappears, thus making the pretilt angle over the openings 27 smaller. With regard to the alignment film which changes the pretilt angle by the irradiation of ultraviolet rays, the effect is the same even if ultraviolet rays are irradiated after rubbing, so that rubbing may be carried out prior to the irradiation of ultraviolet rays.

As shown in FIG. 19B, after the irradiation of ultraviolet rays, rubbing is performed in the direction where the liquid crystal should be aligned. Ultraviolet rays are not irradiated onto the polyimide alignment film 32 on the reflection electrode 20 so that the pretilt-angle predetermined angle stays close to 90 degrees. As rubbing does not significantly change the pretilt angle, alignment is vertical. As the irradiation of ultraviolet rays makes the pretilt angle smaller on the polyimide alignment film 32 above the openings 27, rubbing sets horizontal alignment.

As shown in FIG. 19C, as the opposite substrate 12 is processed with the alignment film that provides horizontal alignment and the alignment is made horizontal by rubbing, the portion of horizontal alignment becomes homogeneous alignment or TN alignment whereas the portion of vertical alignment becomes HAN alignment.

As the liquid crystal mode at the reflection electrode 20 and the openings 27 is changed by using the method shown in FIGS. 19A–19C, the value of the retardation ($\Delta n \cdot d$) is changed by using the difference in refractive index brought about by the liquid crystal mode, so that extreme brightness can be obtained in both the reflection mode and transmission mode even with the same cell thickness.

Figure 20:
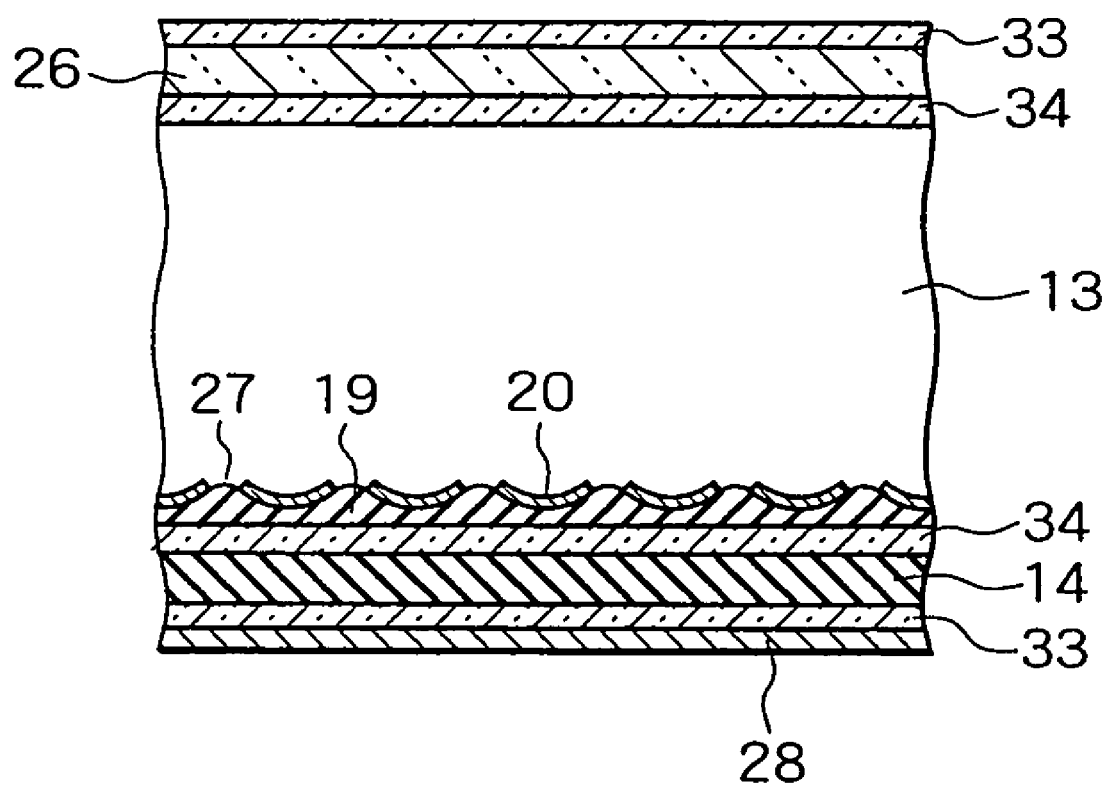
FIG. 20 is a diagram showing the layout of a quarter-wave plate and a sheet polarizer in a TN type.
Figure 21A:
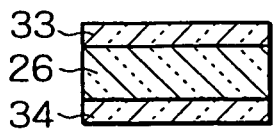
FIGS. 21A through 21I are diagrams showing possible layouts of the quarter-wave plate and the sheet polarizer.
Figure 21B:
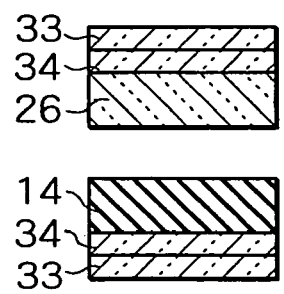
Figure 21C:
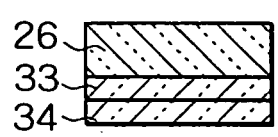
Figure 21D:
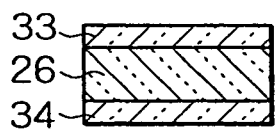
Figure 21E:
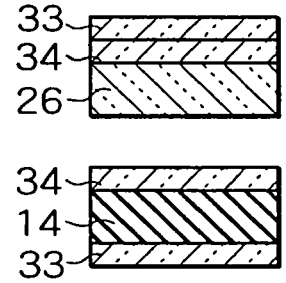
Figure 21F:
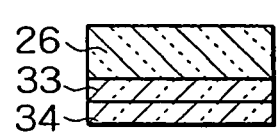
Figure 21G:
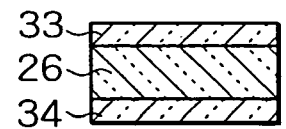
Figure 21H:
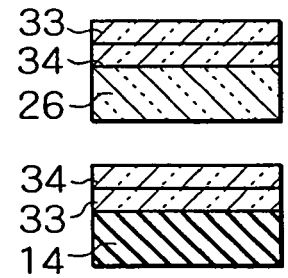
Figure 21I:
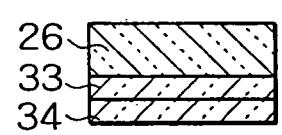

In case where the mode of the liquid crystal layer 13 is the TN mode in the semi-transmission type liquid crystal displays of the first embodiment and the second embodiment, a sheet polarizer and a quarter-wave plate are arranged on the lower substrate 11 and the opposite substrate 12. FIG. 20 shows a cross-sectional view of a liquid crystal display according to the fifth embodiment of the invention.

A sheet polarizer 33 is arranged between the insulative substrate 14 of the lower substrate and the backlight 28, and a quarter-wave plate 34 is arranged between the insulative substrate 14 and the second insulating layer 19. Another quarter-wave plate 34 is arranged on the liquid crystal layer side surface of the insulative substrate 26 of the opposite substrate and another sheet polarizer 33 is arranged on the opposite side surface of the insulative substrate 26 to the liquid crystal layer 13. The directions of polarization of the sheet polarizer 33 on the lower substrate and the sheet polarizer 33 on the opposite substrate are so set as to be perpendicular to each other. Although not illustrated, the TFT 16, the insulating protection film 15, the gate terminal portion 22 and the drain terminal portion 23 are formed on the quarter-wave plate 34 on the lower substrate and the transparent electrode 24 and the color filter 25 are formed between the quarter-wave plate 34 on the opposite substrate and the liquid crystal layer 13, as done in FIGS. 1 and 2.

At the time of twisted alignment in reflection mode, light input from outside the opposite substrate passes through the sheet polarizer 33 to become linearly polarized light, which in turn passes the quarter-wave plate 34 to become right-handed circularly polarized light. The input light of right-handed circularly polarization passes the liquid crystal layer 13 in the twisted alignment to become linearly polarized light, and the reflected light of linearly polarization passes the liquid crystal layer 13 in the twisted alignment to become right-handed circularly polarized light. The reflected light which is right-handed circularly polarized light passes the quarter-wave plate 34 to be linearly polarized light which in turn becomes output light.

At the time of vertical alignment in reflection mode, light input from outside the opposite substrate passes through the sheet polarizer 33 to become linearly polarized light, which in turn passes the quarter-wave plate 34 to become right-handed circularly polarized light. The input light of right-handed circularly polarization passes the liquid crystal layer 13 in the vertical alignment to become linearly polarized light, and is reflected at the reflection electrode 20 to become reflected light of left-handed circularly polarized light which is the reverse rotary to the right-handed circularly polarized light. The reflected light of left-handed circularly polarization passes the liquid crystal layer 13 in the vertical alignment and passes the quarter-wave plate 34 to be linearly polarized light. As the direction of polarization of this linearly polarized light differs from the direction of polarization of the sheet polarizer 33, the reflected light does not pass the sheet polarizer 33.

At the time of twisted alignment in transmission mode, light input from the backlight 28 passes through the sheet polarizer 33 to become linearly polarized light, which in turn passes the quarter-wave plate 34 to become left-handed circularly polarized light. The input light of left-handed circularly polarization passes the liquid crystal layer 13 in the twisted alignment to become transmitted light of right-handed circularly polarization which is the reverse rotary to the left-handed circularly polarized light. The transmitted light of right-handed circularly polarization passes the quarter-wave plate 34 to become linearly polarized light which in turn becomes output light.

At the time of vertical alignment in transmission mode, light input from the backlight 28 passes through the sheet polarizer 33 to become linearly polarized light, which in turn passes the quarter-wave plate 34 to become left-handed circularly polarized light. The input light of left-handed circularly polarization passes the liquid crystal layer 13 in the vertical alignment and passes the quarter-wave plate 34 of the opposite substrate to become linearly polarized light. As the direction of polarization of the linearly polarized light differs from the direction of polarization of the sheet polarizer 33, the transmitted light does not pass the sheet polarizer 33.

Because the quarter-wave plates 34 are arranged closer to the liquid crystal layer 13 than the drive motor 14 and the insulative substrate 26 as shown in FIG. 20, the liquid crystal display once fabricated is not influenced by ultraviolet rays and humidity, which is an advantageous in view of the weather durability. That is, ultraviolet rays are absorbed by not only the sheet polarizer 33 but also the insulative substrate which is a thick glass or plastic substrate, so that the ultraviolet rays hardly reach the quarter-wave plate 34. It is therefore possible to significantly prevent the ultraviolet-rays dependent deterioration as compared with the case where the quarter-wave plate 34 is arranged on the opposite side of the liquid crystal layer 13. Further, the liquid crystal display is not influenced by the humidity.

An adhesive which adheres the sheet polarizer to the quarter-wave plate suffers a possible humidity-oriented separation. The arrangement of the quarter-wave plate 34 on the liquid crystal layer side eliminates the need for an adhesive between the sheet polarizer 33 and the quarter-wave plate 34, thereby solving the problem. This widens the range of materials selectable for the quarter-wave plate 34 and makes it easier to improve the other performances, such as the transmittance.

Because the quarter-wave plate 34 itself is formed by aligning the material that shows liquid crystallinity, there is an effect of aligning the liquid crystal material. Therefore, arranging the quarter-wave plate 34 closer to the liquid crystal layer 13 than the transparent electrode 24 and the reflection electrode 20 eliminates the need for application of an alignment film and a rubbing process. With a 90-degree twisted structure, particularly, it is unnecessary to perform an alignment process on the lower substrate and the opposite substrate. Further, the rubbing process to align the liquid crystal is unnecessary even in the HAN type.

The sheet polarizer 33 can be arranged on the liquid crystal layer side. Because the insulative substrate has a thickness of about 0.7 mm, there is a possibility that output light comes out from the adjoining pixels via the insulative substrate. The arrangement of the sheet polarizer 33 on the liquid crystal layer side prevents the light from a pixel in a non-display state from reaching the insulative substrate. This reduces the possibility of viewing light from the adjoining pixels and improves the visibility. FIGS. 21A through 21I show combinations of the layout relations of the quarter-wave plate, the sheet polarizer and the insulative substrate. The diagrams illustrate only the positional relationships with the insulative substrate and do not show the other structural elements of the liquid crystal display.

Figure 22:
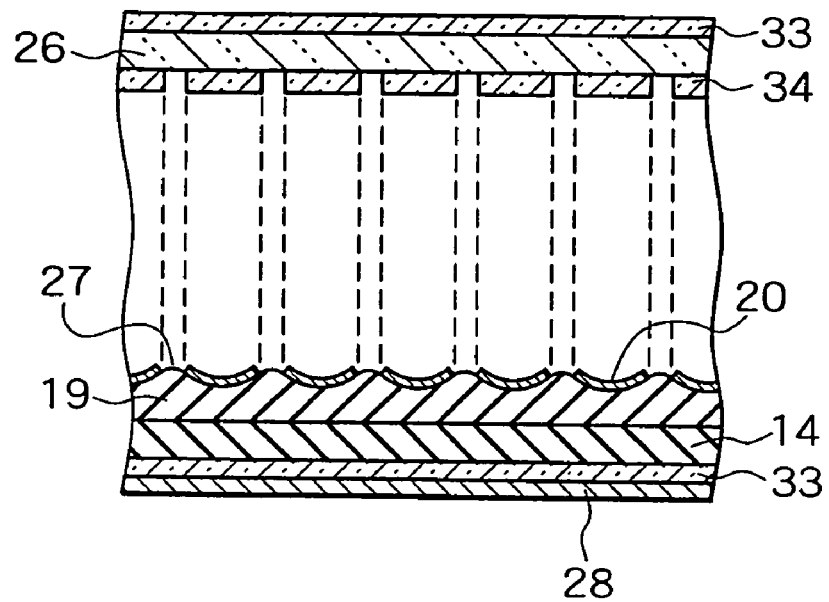
FIG. 22 is a diagram depicting an embodiment in which the quarter-wave plate of the transmission section is removed.

In case where the mode of the liquid crystal layer 13 is the TN mode in the semi-transmission type liquid crystal displays of the first embodiment and the second embodiment, a sheet polarizer and a quarter-wave plate are arranged on the opposite substrate 12 and a sheet polarizer is arranged on the lower substrate 11. A quarter-wave plate is omitted in an area corresponding to the transmission section of the opposite substrate. FIG. 22 shows a cross-sectional view of a liquid crystal display according to the sixth embodiment of the invention.

A sheet polarizer 33 is arranged between the insulative substrate 14 of the lower substrate and the backlight 28. A quarter-wave plate 34 is arranged on the liquid crystal layer side surface of the insulative substrate 26 of the opposite substrate and another sheet polarizer 33 is arranged on the opposite side surface of the insulative substrate 26 to the liquid crystal layer 13. The directions of polarization of the sheet polarizer 33 on the lower substrate and the sheet polarizer 33 on the opposite substrate are so set as to be perpendicular to each other. Although not illustrated, the TFT 16, the insulating protection film 15, the gate terminal portion 22 and the drain terminal portion 23 are formed on the quarter-wave plate 34 on the lower substrate and the transparent electrode 24 and the color filter 25 are formed between the quarter-wave plate 34 on the opposite substrate and the liquid crystal layer 13, as done in FIGS. 1 and 2.

Those areas of the quarter-wave plate 34 arranged on the opposite substrate which correspond to the openings 27 are removed by a photoresisting process and etching process using the mask that has been used at the time of forming the openings 27 in the reflection electrode 20.

The intensity, $I\lambda$, of output light in the case where light from the backlight passes the sheet polarizer and quarter-wave plate of the lower substrate, passes the liquid crystal layer and passes the quarter-wave plate and sheet polarizer of the opposite substrate is given by:

$$I\lambda = \tfrac{1}{2}\{(\Gamma/2)(1/X\cdot\sin X)\}2$$

where $\lambda$ is the wavelength of light, $\Delta n\cdot d$ is the retardation of the liquid crystal layer and $\Gamma = 2\pi\Delta n\cdot d/\lambda$ and $X=\{\phi 2+(\Gamma/2)2\}\tfrac{1}{2}$ on the assumption that the liquid crystal molecules are twisted evenly at a twist angle $\phi$.

On the other hand, the intensity, $I_p$, of output light in the case where light from the backlight does not pass the quarter-wave plate but passes the sheet polarizer of the lower substrate, passes the liquid crystal layer and passes the sheet polarizer of the opposite substrate is given by:

$$I_p = (\tfrac{1}{2})(1/X\cdot\sin X)2[\phi 2\cdot\cos 2\phi + \sin 2\phi(\Gamma/2)2] + \sin 2\phi \cos 2X - \phi \sin 2\phi \cos X(1/X\cdot\sin X).$$

Figure 23:
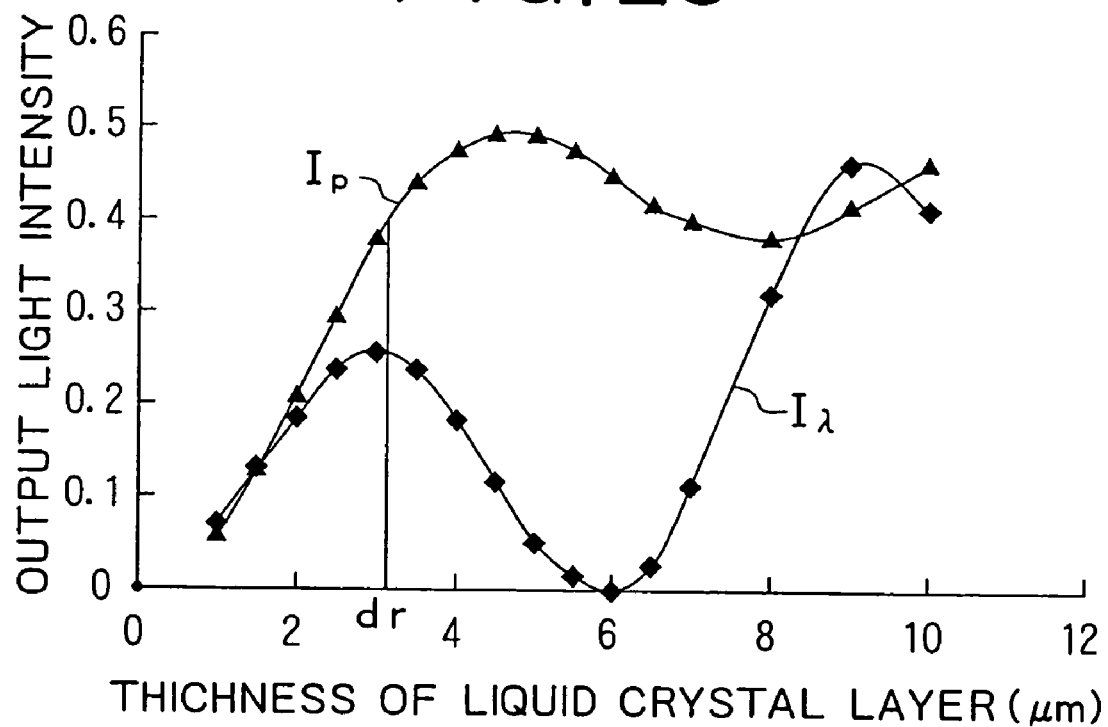
FIG. 23 is a graph of the thickness of the liquid crystal layer 13 and the output light intensity in transmission mode.

FIG. 23 is a graph showing the results of computing the intensity $I\lambda$ of the output light that has passed the quarter-wave plate in transmission mode and the intensity $I_p$ of the output light that has not passed the quarter-wave plate based on the thickness of the liquid crystal layer. The birefringence ($\Delta nd$) at which the intensity of the output light in reflection mode becomes maximum is 270 nm. With the refractive index of the liquid crystal being 0.09, the thickness of the liquid crystal layer in reflection mode becomes about 3 $\mu$m. When the liquid crystal display is designed with the reflection mode as a reference, the thickness of the liquid crystal layer becomes about 3 $\mu$m. It is therefore apparent that in transmission mode the intensity $I_p$ of the output light that passes only the sheet polarizer becomes greater than the intensity $I\lambda$ of the output light in the case where the quarter-wave plate is present.

As shown in FIG. 22, therefore, the intensity of the output light from the liquid crystal display can be increased in both the reflection mode and transmission mode by arranging no quarter-wave plate on the lower substrate and removing that area of the quarter-wave plate arranged on the opposite substrate which faces the transmission section.

FIG. 24 is a diagram depicting another embodiment of the invention in which a cholesteric liquid crystal is laid on the opposite side of the lower substrate to the liquid crystal layer. The cholesteric liquid crystal is the liquid crystal that has a molecular alignment having a spiral periodic structure. In case where the cholesteric liquid crystal has a molecular alignment with a spiral period=P, of light incident parallel to the spiral axis, only light having a wavelength width $\Delta\lambda=P\Delta n$ ($\Delta n$=anisotropy of refractive index) around a wavelength $\lambda=nP$ (where n is a mean refractive index of the liquid crystal) is selectively reflected and the light of that wavelength range passes. In case of a leftward cholesteric liquid crystal, light that satisfies the wavelength condition is separated into right-handed circularly polarized light and left-handed circularly polarized light, and only the former polarized light is reflected and the latter passes directly. In case of a rightward cholesteric liquid crystal, the opposite is applied.

A cholesteric liquid crystal 35 is arranged between the insulative substrate 14 of the lower substrate and the backlight. The quarter-wave plate 34 is arranged on the liquid crystal layer side of the insulative substrate 26 of the opposite substrate and the sheet polarizer 33 is arranged on the opposite side of the insulative substrate 26 to the liquid crystal layer 13. Although not illustrated, the TFT 16, the insulating protection film 15, the gate terminal portion 22 and the drain terminal portion 23 are formed on the lower substrate and the transparent electrode 24 and the color filter 25 are formed between the quarter-wave plate 34 on the opposite substrate and the liquid crystal layer 13, as done in FIGS. 1 and 2. The cholesteric liquid crystal 35 is comprised of three layers which have spiral periods corresponding to the wavelengths of RGB colors and which reflect the circularly polarized light of the same direction.

In the fifth embodiment, the same advantages as those of the fourth embodiment can be obtained by arranging the cholesteric liquid crystal 35 instead of arranging the sheet polarizer 33 and the quarter-wave plate 34 on the lower substrate.

FIG. 25 is a diagram depicting another embodiment of the invention in which a quarter-wave plate and a cholesteric liquid crystal are arranged on the opposite side of the lower substrate to the liquid crystal layer and a sheet polarizer and a quarter-wave plate are arranged on the opposite substrate. Those areas of the quarter-wave plate on the opposite substrate which face the openings 27 in the reflection electrode 20 are removed.

A cholesteric liquid crystal 35 is arranged between the insulative substrate 14 of the lower substrate and the backlight. A quarter-wave plate 34 is arranged between the backlight 28 and the cholesteric liquid crystal 35. The quarter-wave plate 34 is arranged on the liquid crystal layer side of the insulative substrate 26 of the opposite substrate and the sheet polarizer 33 is arranged on the opposite side of the insulative substrate 26 to the liquid crystal layer 13. Although not illustrated, the TFT 16, the insulating protection film 15, the gate terminal portion 22 and the drain terminal portion 23 are formed on the quarter-wave plate 34 of the lower substrate and the transparent electrode 24 and the color filter 25 are formed between the quarter-wave plate 34 on the opposite substrate and the liquid crystal layer 13, as done in FIGS. 1 and 2.

Those areas of the quarter-wave plate 34 arranged on the opposite substrate which correspond to the openings 27 are removed by a photoresisting process and etching process using the mask that has been used at the time of forming the openings 27 in the reflection electrode 20.

Arranging the cholesteric liquid crystal 35 and the quarter-wave plate 34 instead of arranging the sheet polarizer 33 on the lower substrate can increase the output light intensity of the liquid crystal display in both the reflection mode and transmission mode as per the fifth embodiment.

Figure 26:
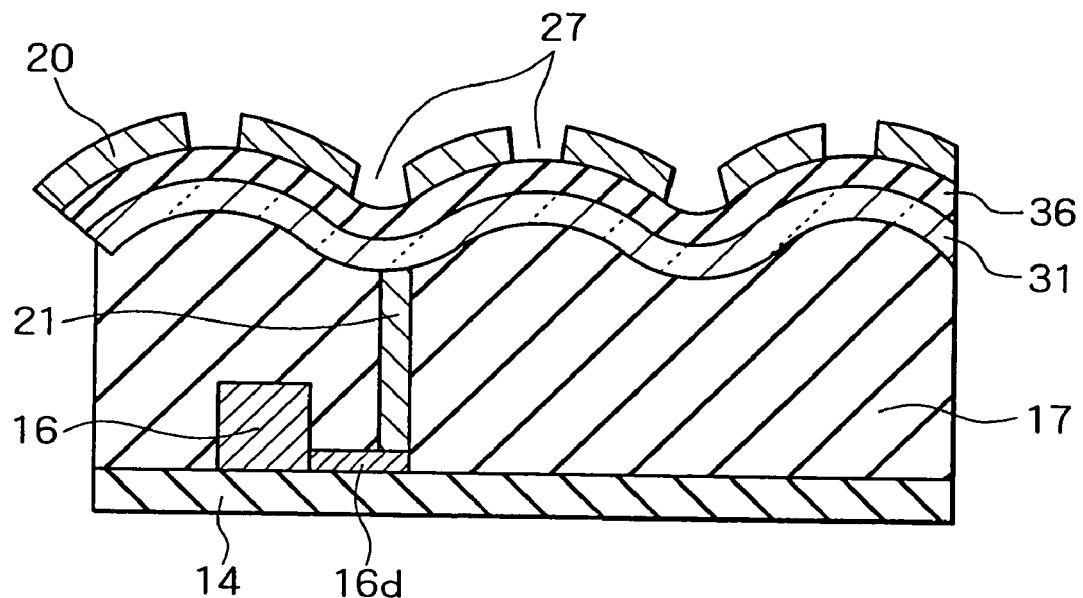
FIG. 26 is a cross-sectional view of a liquid crystal display according to a ninth embodiment.

A further embodiment of the invention will be discussed below. FIG. 26 is a cross-sectional view showing a part of the lower substrate of the ninth embodiment in a simplified form. A contact hole 21 reaching the source electrode 16d of the TFT 16 is bored in the insulating layer 17. A transparent electrode 31, an insulating film 36 and a reflection electrode 20 are deposited, covering the contact hole 21 and the insulating layer 17. The transparent electrode 31 is connected to the source electrode 16d or the drain electrode 16b of the TFT 16 and has a function to serve as a pixel electrode. The transparent insulating film 36 of $SiO_2$ or the like is deposited between the transparent electrode 31 and the reflection electrode 20. The reflection electrode 20 is electrically connected to the transparent electrode 31 via the insulating film 36, and has a function to serve as a reflector and a pixel electrode.

The insulating layer 17 has an undulated surface, and the transparent electrode 31 and the reflection electrode 20 formed on the insulating layer 17 have undulated surfaces too. The reflection electrode 20 and the insulating film 36 are removed at the top areas and bottom areas of the undulated surface of the reflection electrode 20 and the openings 27 are formed in such a way that the transparent electrode 31 contact the liquid crystal layer 13.

Although not illustrated, an alignment film of polyimide or the like which aligns the liquid crystal molecules is deposited, covering the reflection electrode 20 and transparent electrode 31. As the alignment film is rubbed, the alignment direction of the liquid crystal molecules of the liquid crystal layer 13 is determined. As the transparent electrode 31 is electrically connected to the source electrode 16d of the TFT 16 via the contact hole 21, the potential supplied by the TFT 16 becomes equal to the potential of the transparent electrode 31. As the reflection electrode 20 is connected via the insulating film 36 to the transparent electrode 31, however, the potential of the reflection electrode 20 becomes lower than the potential of the transparent electrode 31. At this time, a capacitor is formed by the reflection electrode 20, the transparent electrode 31 and the insulating film 36.

Figure 27:
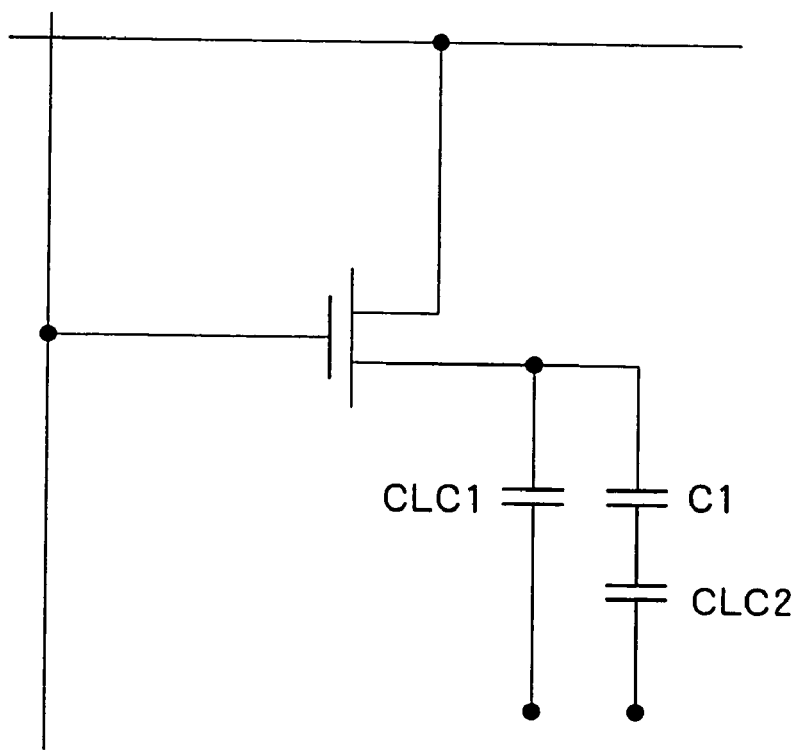
FIG. 27 is an equivalent circuit diagram of the liquid crystal display of the ninth embodiment.

An equivalent circuit of the liquid crystal display according to the ninth embodiment becomes the one shown in FIG. 27. Provided that the structure of sandwiching the liquid crystal layer 13 between the lower substrate 11 and the opposite substrate 12 is regarded as a capacitor, let CLC1 be the combination of the transparent electrode 31 in the openings 27 and the opposite substrate 12, let CLC2 be the combination of the reflection electrode 20 and the opposite substrate 12, and let Cl be the reflection electrode 20 connected to the transparent electrode 31 via the insulating film 36. Because two capacitors, CLC2 and Cl, are connected in series in the area of the reflection electrode 20, the voltage applied by the TFT 16 is capacitively divided so that the voltage applied to the liquid crystal layer 13 becomes lower than the voltage applied only to the CLC1 in the area of the transparent electrode 31.

It is known that with $\lambda$ being the wavelength of light used for display, the reflection type liquid crystal display provides output light with the highest intensity when the birefringence (retardation) of the liquid crystal layer 13 is $\lambda/4$ while the transmission type liquid crystal display provides output light with the highest intensity when the birefringence is λ/2. It is also known that as the voltage applied to the liquid crystal layer 13 is increased, the birefringence of the liquid crystal layer 13 is increased monotonously. It is therefore possible to optimize the birefringence of the liquid crystal layer 13 in both the transmission mode and reflection mode by depositing the insulating film 36 on the transparent electrode 31 so as to provide the equivalent circuit shown in FIG. 27, which produces a potential difference between the surface of the transparent electrode 31 and the reflection electrode 20. Available materials for the insulating film 21 are organic materials, such as SiN, $SiO_2$, acryl and arton. Because the capacitances of the CLC1 ad CLC2 in FIG. 27 change according to the material for, and the thickness of, the liquid crystal layer 13 and the relationship between the applied voltage and the birefringence also varies depending on the material for the liquid crystal layer 13, however, it is necessary to adequately adjust the material for and the thickness of the insulating film 36.

Figure 28A:
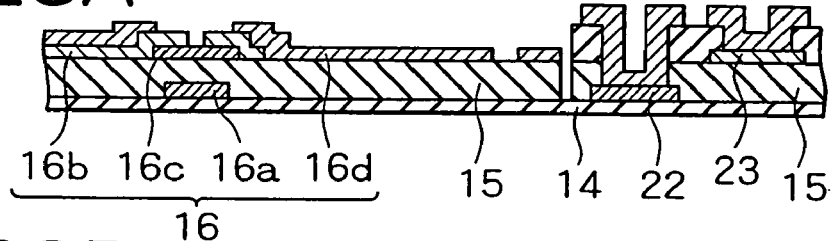
FIGS. 28A through 28F are cross-sectional views illustrating, step by step, a method of manufacturing the liquid crystal display shown in FIG. 26.

FIGS. 28A through 28F are cross-sectional views showing a fabrication process for the lower substrate in the process of manufacturing the semi-transmission type liquid crystal display shown in FIG. 26. First, as shown in FIG. 28A, the gate electrode 16a is formed on the insulative substrate 14, the insulating protection film 15 is deposited on the gate electrode 16a and the drain electrode 16b, the semiconductor layer 16c and the source electrode 16d are formed on the insulating protection film 15, thereby forming the substrate of the TFT 16 as a switching element. The switching element is not limited to the TFT 16 but a substrate for other switching elements, such as a diode, may be prepared as well.

Further, the insulating layer 17 is deposited covering the TFT 16. To form the undulated surface on the insulating layer 17, after the deposition of the flat insulating layer 17, masking is applied and steps are formed on the insulating layer 17 using a photoresist. Then, an annealing treatment is performed to make the corners of the steps of the insulating layer 17 round, so that the insulating layer 17 formed has gentle undulations on the surface.

Figure 28B:
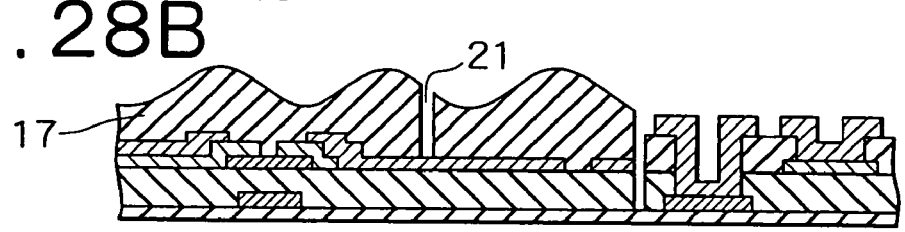
Figure 28C:
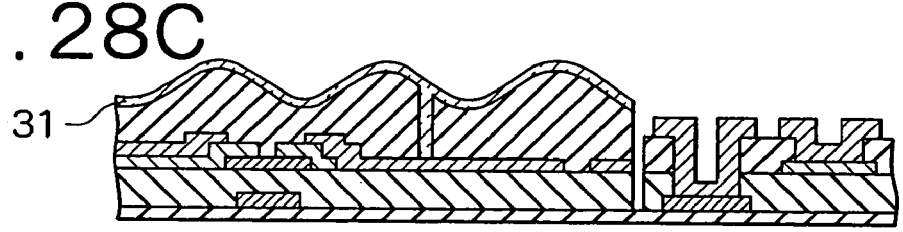
Figure 28D:
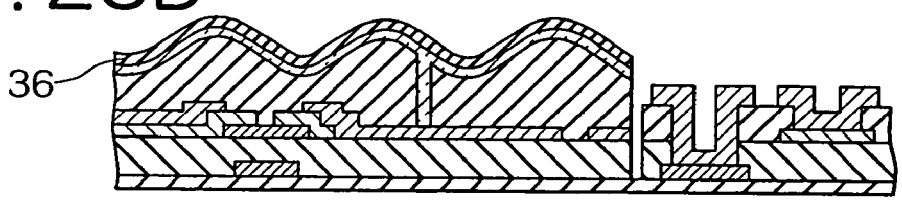
Figure 28E:
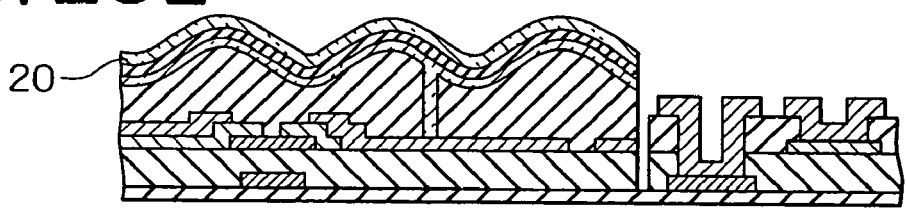

Next, as shown in FIG. 28B, the contact hole 21 reaching the source electrode 16d is formed in the insulating layer 17. Then, as shown in FIG. 28C, the transparent electrode 31 of ITO is deposited, covering the insulating layer 17 by sputtering, allowing the source electrode 16d to electrically contact the transparent electrode 31 via the contact hole 21. Further, as shown in FIG. 28D, the insulating film 36 of $SiO_2$ is deposited on the transparent electrode 31 by CVD. Then, the reflection electrode 20 which is an Al film is formed on the insulating film 36 by vacuum deposition, as shown in FIG. 28E.

Figure 28F:
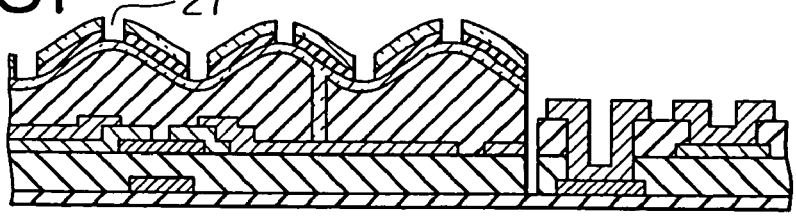
Figure 29:
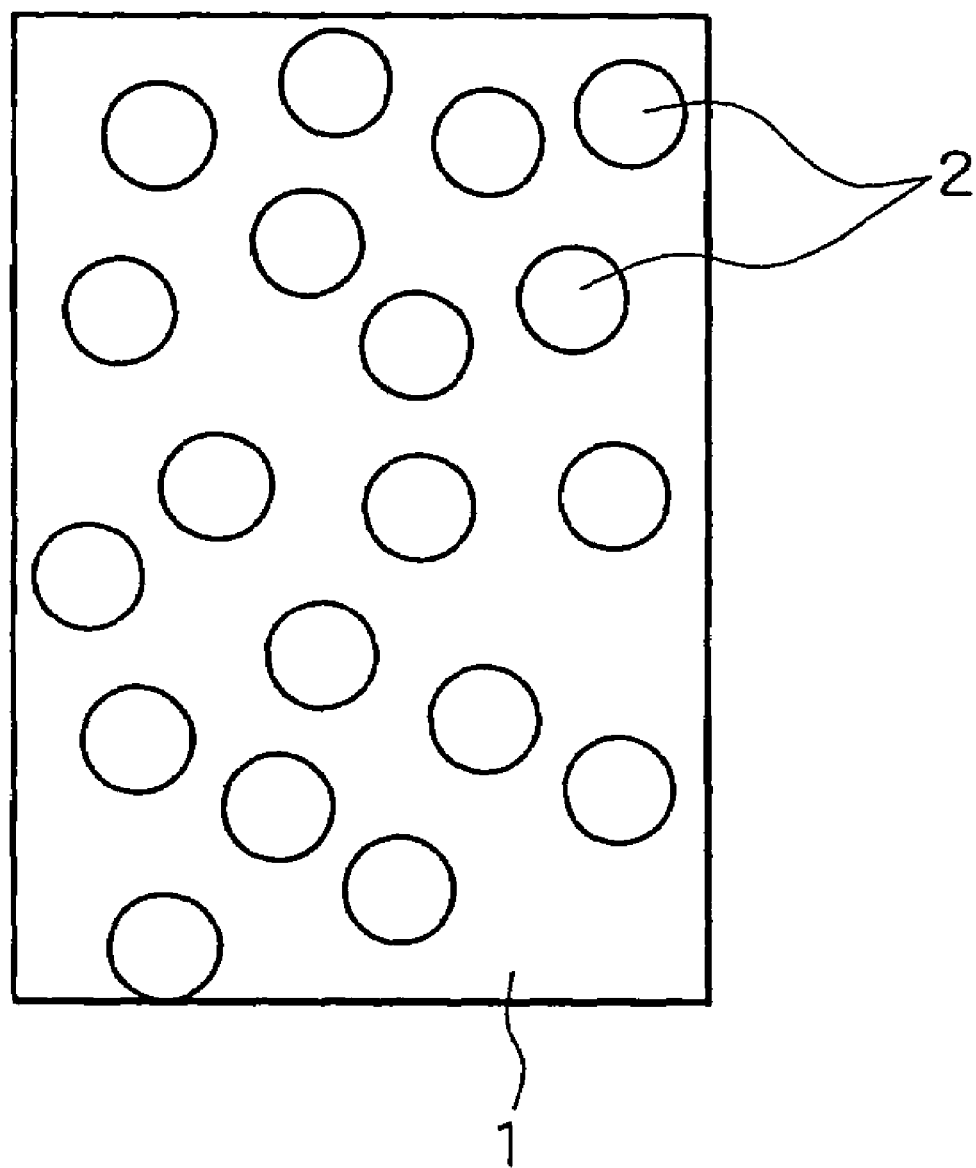
FIG. 29 is a plan view showing an example of projection patterns formed on a conventional reflector.
Figure 30:
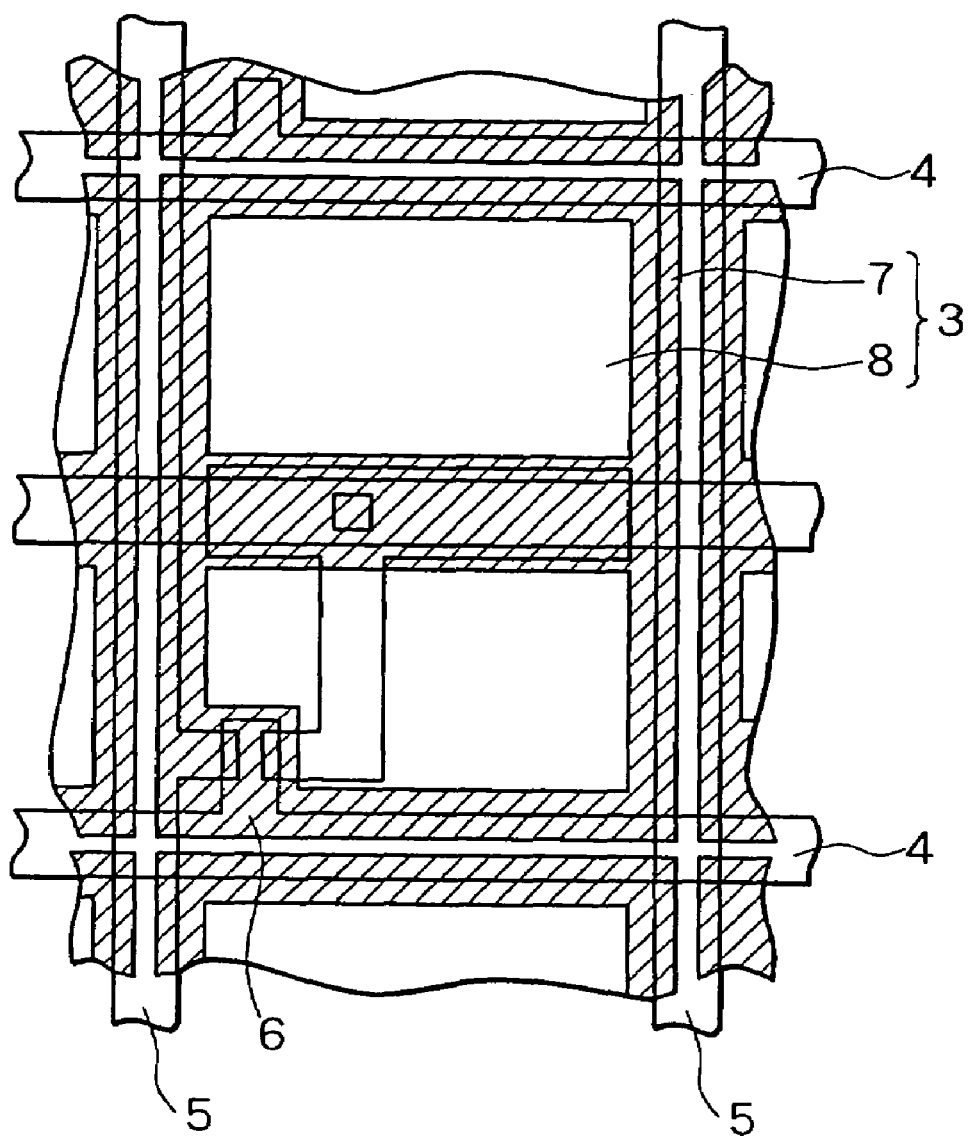
FIG. 30 is a diagram showing pixels of a conventional semi-transmission type liquid crystal display.
Figure 31:
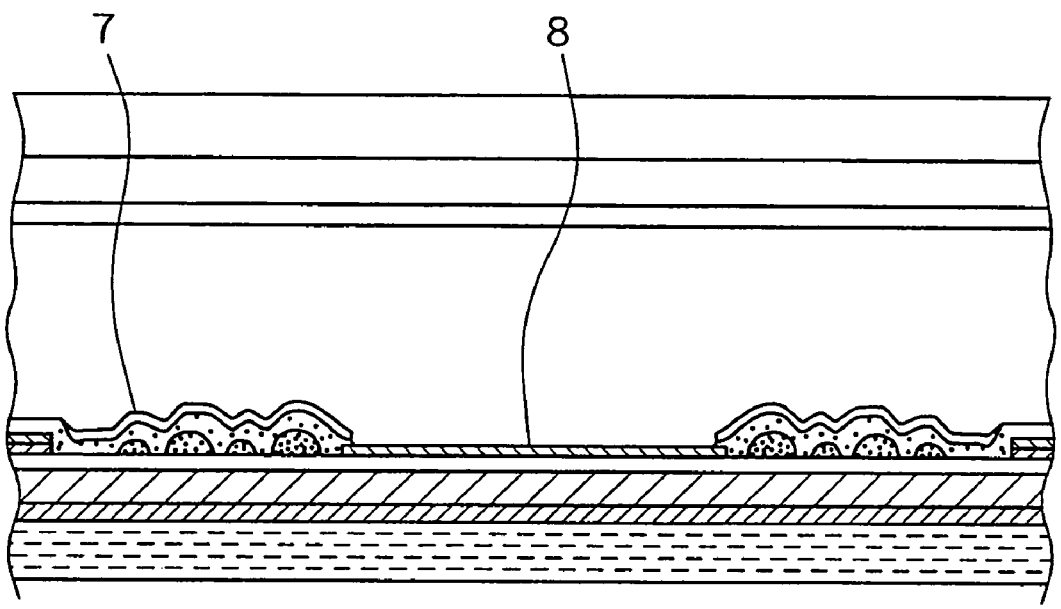
FIG. 31 is a cross-sectional view of the conventional semi-transmission type liquid crystal display.

Based on the mask that has been used in the process in FIG. 28B to form the undulations on the insulating layer 17, the top areas and bottom areas of the undulated surface of the reflection electrode 20 are specified. Using the mask that has holes opened at the positions corresponding to the top areas and bottom areas, the reflection electrode 20 and the insulating film 36 at the top areas and bottom areas are removed by etching and a photoresist, thereby forming the openings 27. As shown in FIG. 28F, the transparent electrode 31 is exposed at the openings 27.

The material for the reflection electrode 20 is not limited to Al, but other conductive materials can be used as well. The lower substrate 11 is fabricated in the above-described manner and is made to face, via a frame member, the opposite substrate 12 on which the color filter and the transparent electrode are deposited, and the liquid crystal layer 13 is injected between both substrates, which completes the fabrication of the liquid crystal display.

According to the invention, as the openings are provided in the reflection electrode, light is irradiated by a backlight or the like from the opposite side of the device substrate to the liquid crystal layer in transmission mode, allowing the light to pass the liquid crystal layer for liquid crystal display, so that display can be recognized even under a dark environment. As the normal direction of the reflection electrode is distributed unevenly to a specific azimuth angle, the undulated shape on the surface of the reflector is formed with anisotropy and the reflection light intensity depends on the azimuth angle, it is possible to increase the reflection light intensity in the normal direction of the reflector which has a polar angle of 0 degree at a specific bearing angle. This increases the amount of light reflected to a viewer, thereby ensuring an improvement of the visibility of the display that uses the reflector.

As color filters are formed on the opposite substrate and the device substrate, light passes the color filter on the opposite substrate side twice in reflection mode and passes the color filters on the device substrate and the opposite substrate once each in transmission mode. This can make it possible to reduce a change in color in both modes. It is also possible to respectively set the hues in transmission mode and reflection mode. Further, the reflection electrode is formed on the color filters, the planarization of that surface of the device substrate which contacts the liquid crystal layer becomes improved, making it possible to effectively control the alignment direction in a rubbing process.

The undulated shape on the surface of the reflector is formed with anisotropy, the reflection light intensity depends on the azimuth angle and two or more peak values appear in the polar angle distribution of the reflection light intensity at the azimuth angle. This makes it possible to increase the reflection light intensity in the normal direction of the reflector which has a polar angle of 0 degree at a specific bearing angle.

By forming the undulated shape by projection patterns and insulating layer and changing the line width, line length and thickness of the projection patterns and the thickness of the insulating layer, it is possible to design the undulated shape in such a way as to maximize the anisotropy of the reflector and the reflection light intensity in the normal direction.

As the drive voltage applied to the liquid crystal layer in the reflection electrode is lower than the drive voltage applied to the liquid crystal layer in the transmission area, a change in the birefringence of the liquid crystal layer in the reflection area becomes smaller than a change in the birefringence of the liquid crystal layer in the transmission area. This makes it possible to set the optimal change in birefringence in each of the reflection mode and transmission mode, so that the output light intensity can be optimized in both modes.

As the non-effective area where the openings are formed has a tilt angle of 0 degree to 2 degrees and/or a tilt angle of 10 degrees or higher, the non-effective area cannot efficiently reflect light input from the opposite substrate toward a viewer. Therefore, the luminance does not significantly drop even in reflection mode in which the light input from the opposite substrate is reflected at the reflection electrode for liquid crystal display.

The interconnections, the thin film transistors and the storage capacitors are formed of opaque materials. Even if openings are formed in those areas of the reflection electrode which overlap the interconnections, the thin film transistors and the storage capacitors, therefore, it is not possible to pass light from the backlight. If openings are formed in the mentioned areas, the interconnections, the lights reflected by the thin film transistors and the storage capacitors change the displayed colors of the liquid crystal. Therefore, forming no openings in those areas can prevent the liquid crystal display colors from changing.

As the number of the openings in pixels can be made different display color by display color, the color balance in the transmission mode display can be changed. In case where the best color balance in reflection mode differs from that in transmission mode, the color balances in reflection mode and transmission mode can be changed. This can ensure liquid crystal display in such a way that the color balance becomes optimal in both modes.

The luminance of the liquid crystal display in reflection mode and transmission mode can be enhanced regardless of the mode of the liquid crystal molecular alignment of the liquid crystal layer. It is therefore possible to select the liquid crystal mode in accordance with the usage and the production cost.

The retardation of the liquid crystal layer in reflection mode and transmission mode can be changed by setting the mode of the liquid crystal molecular alignment in reflection mode can be made different from the one in transmission mode. This makes it possible to enhance the output light intensity in both modes.

As the reflection electrode is formed on the transparent electrode, the direction of an electric field around each opening can be stabilized. This can suppress the disturbance of the liquid crystal molecular alignment.

The provision of the quarter-wave plate on the liquid crystal layer side of the opposite substrate can prevent the quarter-wave plate from being deteriorated by external factors, such as the ultraviolet rays and humidity, thereby leading to the elongated life of the liquid crystal display. Because the quarter-wave plate itself is formed of a material aligned that shows a liquid crystallinity, it is possible to eliminate the need for coating of an alignment film and a rubbing process to align the liquid crystal layer. This can contribute to shortening the manufacturing time and reducing the production cost.

With the thickness of the liquid crystal layer optimized for the reflection mode, a higher output light intensity can be acquired in the transmission mode that uses the quarter-wave plate than in the transmission mode that does not use the quarter-wave plate. Forming the second openings in that area of the quarter-wave plate which faces the openings can provide display without the quarter-wave plate in transmission mode, thus making it possible to increase the luminance in transmission mode.

Because the cholesteric liquid crystal shows the characteristic which is the characteristics of a sheet polarizer and a quarter-wave plate combined together, the use of the cholesteric liquid crystal in place of the sheet polarizer and the quarter-wave plate can contribute to shortening the manufacturing time and reducing the production cost.

As the cholesteric liquid crystal and the quarter-wave plate are provided on the opposite side of the device substrate to the liquid crystal layer, it is possible to enhance the output light intensity of the liquid crystal display in reflection mode as well as in transmission mode.

What is claimed is:

1. A liquid crystal display comprising:
    a device substrate on which interconnections, thin film transistors and storage capacitors are formed;
    an opposite substrate so arranged as to face said device substrate;
    a liquid crystal layer sandwiched between said device substrate and said opposite substrate;
    a first color filter formed on said opposite substrate;
    a second color filter formed on said thin film transistors;
    a reflection electrode formed on said second color filter and having an undulated shape; and
    openings provided in a non-effective area of said reflection electrode.

2. The liquid crystal display according to claim 1, wherein a normal direction on a surface of said reflection electrode is distributed unevenly to a specific azimuth angle and a polar angle distribution of a reflection light intensity at said azimuth angle has two or more peak values.

3. The liquid crystal display according to claim 1, wherein said undulated shape has recesses with a shape of a closed figure formed by a plurality of projection patterns of line shapes.

4. The liquid crystal display according to claim 1, wherein said openings are provided in said non-effective area of said reflection electrode as a transmission area, an effective area of said reflection electrode is a reflection area, and a potential difference between a drive voltage applied to that surface of said device substrate which faces said liquid crystal layer and a drive voltage applied to that surface of said opposite substrate which faces said liquid crystal layer is smaller in said transmission area than in said reflection area.

5. The liquid crystal display according to claim 1, wherein said non-effective area has a tilt angle of 0 degree to 2 degrees and/or a tilt angle of 10 degrees or higher.

6. The liquid crystal display according to claim 1, wherein said openings are provided only in that area of said reflection electrode which overlaps that area of said device substrate which passes light.

7. The liquid crystal display according to claim 1, wherein said openings are provided only in that area of said reflection electrode which overlaps that area of said device substrate which passes light.

8. The liquid crystal display according to claim 1, wherein said openings are not provided only in that area of said reflection electrode which overlaps said interconnections, said thin film transistors and said storage capacitors.

9. The liquid crystal display according to claim 1, wherein said openings are not provided only in that area of said reflection electrode which overlaps said interconnections, said thin film transistors and said storage capacitors.

10. The liquid crystal display according to claim 1, wherein a number of said openings in pixels is set for each display color.

11. The liquid crystal display according to claim 1, wherein areas of said openings in pixels are set for each display color.

12. The liquid crystal display according to claim 1, wherein a mode of a liquid crystal molecular alignment of said liquid crystal layer is one of a homogeneous type, homeotropic type, a TN type, a HAN type and an OCB type.

13. The liquid crystal display according to claim 12, wherein said mode of said liquid crystal molecular alignment of said liquid crystal layer is set in an area where said reflection electrode exists and an area of said openings for each area.

14. The liquid crystal display according to claim 1, wherein said transparent electrode is formed on said device substrate and said reflection electrode is formed in contact with said transparent electrode on that side of said liquid crystal layer.

15. The liquid crystal display according to claim 1, wherein a quarter-wave plate is provided on a liquid crystal layer side of said opposite substrate.

16. The liquid crystal display according to claim 15, wherein second openings are formed in that area of said quarter-wave plate which faces said openings.

17. The liquid crystal display according to claim 16, wherein a cholesteric liquid crystal is provided on an opposite side of said device substrate to said liquid crystal layer.

18. The liquid crystal display according to claim 16, wherein a second quarter-wave plate is provided on a liquid crystal layer side of said device substrate.

19. The liquid crystal display according to claim 16, wherein a cholesteric liquid crystal is provided on an opposite side of said device substrate to said liquid crystal layer and a second quarter-wave plate is provided between said cholesteric liquid crystal and said device substrate.

* * * * *